US012764551B2

(12) United States Patent
Anderson

(10) Patent No.: US 12,764,551 B2
(45) Date of Patent: Oct. 13, 2026

(54) PARTIAL FREQUENCY TIME RESOURCE REUSE COORDINATION FOR INTERFERENCE MITIGATION IN FREQUENCY REUSE RADIO NETWORKS

(71) Applicant: Aclara Technologies LLC, St. Louis, MO (US)

(72) Inventor: Jeff Sumrall Anderson, Saint Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 18/267,699

(22) PCT Filed: Apr. 28, 2023

(86) PCT No.: PCT/US2023/020396

§ 371 (c)(1),
(2) Date: Jun. 15, 2023

(87) PCT Pub. No.: WO2023/212313

PCT Pub. Date: Nov. 2, 2023

(65) Prior Publication Data

US 2025/0048116 A1 Feb. 6, 2025

Related U.S. Application Data

(60) Provisional application No. 63/336,536, filed on Apr. 29, 2022.

(51) Int. Cl.

*H04W 16/14* (2009.01)
*H04L 5/00* (2006.01)

(Continued)

(52) U.S. Cl.

CPC ........... *H04W 16/14* (2013.01); *H04L 5/0005* (2013.01); *H04W 72/044* (2013.01); *H04W 88/08* (2013.01)

(58) Field of Classification Search

None

See application file for complete search history.

(56) References Cited

U.S. PATENT DOCUMENTS 7,474,895 B1 * 1/2009 Jiang ................ H04W 72/0453 455/447
2007/0099561 A1 * 5/2007 Voss ...................... H04W 24/00 455/67.11

(Continued)

OTHER PUBLICATIONS

PCT/US2023/020396 International Search Report and Written Opinion dated Jul. 18, 2023.

(Continued)

*Primary Examiner* — Jamaal Henson

(74) *Attorney, Agent, or Firm* — Michael Best & Friedrich LLP

(57) ABSTRACT

Systems and methods for partial frequency time resource reuse coordination. One example method includes transmitting, via a transceiver, a first network message including a transmit power level for the wireless base station and an identifier for the wireless base station. The method includes receiving, via the transceiver, a second network message from an end node, the second network message including the identifier and a radiofrequency signal characteristic for the end node. The method includes selecting, with an electronic processor, an interference coordination zone for the end node based on the radiofrequency characteristic for the end node. The method includes selecting, with the electronic (Continued)

processor, a frequency time resource for the end node based on the interference coordination zone. The method includes transmitting, via the transceiver, a third network message to the end node, the third network message including the frequency time resource.

18 Claims, 20 Drawing Sheets

(51) Int. Cl.
*H04W 72/044* (2023.01)
*H04W 88/08* (2009.01)

(56) References Cited

U.S. PATENT DOCUMENTS

2008/0031197 A1* 2/2008 Wang .................... H04W 72/54 370/329
2010/0189065 A1* 7/2010 Bahk ................... H04W 72/121 370/329
2010/0216486 A1* 8/2010 Kwon ................... H04W 72/27 455/452.2
2010/0238895 A1* 9/2010 Nakatsugawa ....... H04W 16/14 370/329
2010/0267408 A1* 10/2010 Lee ....................... H04W 72/27 455/509
2010/0272218 A1* 10/2010 Yeh ....................... H04L 5/0035 375/330
2011/0110251 A1* 5/2011 Krishnamurthy ... H04W 72/541 370/252
2012/0129536 A1* 5/2012 Zou ..................... H04W 52/146 455/422.1
2013/0039195 A1 2/2013 Weng et al.
2014/0301245 A1* 10/2014 Rose ................... H04L 41/0823 370/255
2015/0085805 A1* 3/2015 Li ....................... H04W 72/121 370/329
2015/0133129 A1* 5/2015 Chiang ................. H04W 16/10 455/447
2015/0264620 A1 9/2015 Timus et al.
2015/0311967 A1 10/2015 Boudreau et al.
2019/0342061 A1* 11/2019 Kim .......................... H04L 5/10
2020/0413413 A1* 12/2020 Haghighat ............ H04L 5/0092

OTHER PUBLICATIONS

Extended European Search Report dated Mar. 24, 2026 for corresponding European Application No. 23797350.8, pp. 1-8.

* cited by examiner

400

404 402 406 408

| Base Station ID | Pathloss (dB) | SIR(dB) | Interferes? |
|---|---|---|---|
| 1 | 90 | - | - |
| 2 | 100 | 10 | 1 |
| 3 | 105 | 15 | 1 |
| 4 | 110 | 20 | 0 |
| 5 | 115 | 25 | 0 |
| 6 | 120 | 30 | 0 |
| 7 | 125 | 35 | 0 |
| 8 | 130 | 40 | 0 |
| 9 | 135 | 45 | 0 |
| 10 | 140 | 50 | 0 |
| 11 | 145 | 55 | 0 |
| 12 | 150 | 60 | 0 |
| 13 | 999 | 909 | 0 |
| 14 | 999 | 909 | 0 |
| 15 | 999 | 909 | 0 |
| 16 | 999 | 909 | 0 |
| 17 | 999 | 909 | 0 |
| 18 | 999 | 909 | 0 |
| 19 | 999 | 909 | 0 |

FIG. 4

500

504 502 506 508

| Base Station ID | Pathloss (dB) | SIR(dB) | Interferes? |
|---|---|---|---|
| 1 | 70 | - | - |
| 2 | 100 | 30 | 0 |
| 3 | 105 | 35 | 0 |
| 4 | 110 | 40 | 0 |
| 5 | 115 | 45 | 0 |
| 6 | 120 | 50 | 0 |
| 7 | 125 | 55 | 0 |
| 8 | 130 | 60 | 0 |
| 9 | 135 | 65 | 0 |
| 10 | 140 | 70 | 0 |
| 11 | 145 | 75 | 0 |
| 12 | 150 | 80 | 0 |
| 13 | 999 | 929 | 0 |
| 14 | 999 | 929 | 0 |
| 15 | 999 | 929 | 0 |
| 16 | 999 | 929 | 0 |
| 17 | 999 | 929 | 0 |
| 18 | 999 | 929 | 0 |
| 19 | 999 | 929 | 0 |

FIG. 5

700

704 702

| Base Station ID | | | | | | | | | | | | |
|---|---|---|---|---|---|---|---|---|---|---|---|---|
| 1 | 1 | 2 | 0 | 3 | 0 | 0 | 5 | 0 | 0 | 0 | 0 | 7 |
| 2 | 1 | 0 | 2 | 0 | 3 | 0 | 0 | 5 | 0 | 0 | 0 | 0 |
| 3 | 1 | 2 | 0 | 0 | 0 | 3 | 0 | 0 | 5 | 0 | 0 | 0 |
| 4 | 1 | 0 | 2 | 3 | 0 | 0 | 0 | 0 | 0 | 5 | 0 | 0 |
| 5 | 1 | 2 | 0 | 0 | 3 | 0 | 0 | 0 | 0 | 0 | 5 | 0 |
| 6 | 1 | 0 | 2 | 0 | 0 | 3 | 5 | 0 | 0 | 0 | 0 | 0 |
| 7 | 1 | 2 | 0 | 3 | 0 | 0 | 0 | 5 | 0 | 0 | 0 | 0 |
| 8 | 1 | 0 | 2 | 0 | 3 | 0 | 0 | 0 | 5 | 0 | 0 | 7 |
| 9 | 1 | 2 | 0 | 0 | 0 | 3 | 0 | 0 | 0 | 5 | 0 | 0 |
| 10 | 1 | 0 | 2 | 3 | 0 | 0 | 0 | 0 | 0 | 0 | 5 | 0 |
| 11 | 1 | 2 | 0 | 0 | 3 | 0 | 5 | 0 | 0 | 0 | 0 | 0 |
| 12 | 1 | 0 | 2 | 0 | 0 | 3 | 0 | 5 | 0 | 0 | 0 | 0 |
| 13 | 1 | 2 | 0 | 3 | 0 | 0 | 0 | 0 | 5 | 0 | 0 | 0 |
| 14 | 1 | 0 | 2 | 0 | 3 | 0 | 0 | 0 | 0 | 5 | 0 | 0 |
| 15 | 1 | 2 | 0 | 0 | 0 | 3 | 0 | 0 | 0 | 0 | 5 | 7 |
| 16 | 1 | 0 | 2 | 3 | 0 | 0 | 5 | 0 | 0 | 0 | 0 | 0 |
| 17 | 1 | 2 | 0 | 0 | 3 | 0 | 0 | 5 | 0 | 0 | 0 | 0 |
| 18 | 1 | 0 | 2 | 0 | 0 | 3 | 0 | 0 | 5 | 0 | 0 | 0 |
| 19 | 1 | 2 | 0 | 3 | 0 | 0 | 0 | 0 | 0 | 5 | 0 | 0 |
| PFR Zone | 1 | 2 | 2 | 3 | 3 | 3 | 5 | 5 | 5 | 5 | 7 | 7 |
| FTRB Permutation ID | 1 | 1 | 2 | 1 | 2 | 3 | 1 | 2 | 3 | 4 | 5 | 1 |
| Multiframe Index | 1 | 2 | 3 | 4 | 5 | 6 | 7 | 8 | 9 | 10 | 11 | 12 |
| Virtual Channels | 19 | 10 | 9 | 7 | 6 | 6 | 4 | 4 | 4 | 4 | 3 | 3 |
| Time (s) | 0.125 | 0.250 | 0.375 | 0.500 | 0.625 | 0.750 | 0.875 | 1.000 | 1.125 | 1.250 | 1.375 | 1.500 |

FIG. 7

| Example Frequency Time Resource Matrix (FTRM) - Type 1 [1,2,3,5,7,19] | | | | | | | | | | | | | |
|---|---|---|---|---|---|---|---|---|---|---|---|---|---|
| 0 | 0 | 0 | 0 | 0 | 0 | 19 | 0 | 0 | 0 | 0 | 0 | 0 | 0 |
| 7 | 0 | 0 | 0 | 0 | 0 | 0 | 19 | 0 | 0 | 0 | 0 | 0 | 0 |
| 0 | 7 | 0 | 0 | 0 | 0 | 0 | 0 | 19 | 0 | 0 | 0 | 0 | 0 |
| 0 | 0 | 7 | 0 | 0 | 0 | 0 | 0 | 0 | 19 | 0 | 0 | 0 | 0 |
| 0 | 0 | 0 | 7 | 0 | 0 | 0 | 0 | 0 | 0 | 19 | 0 | 0 | 0 |
| 0 | 0 | 0 | 0 | 7 | 0 | 0 | 0 | 0 | 0 | 0 | 19 | 0 | 0 |
| 0 | 0 | 0 | 0 | 0 | 7 | 0 | 0 | 0 | 0 | 0 | 0 | 19 | 0 |
| 0 | 0 | 0 | 0 | 0 | 0 | 0 | 0 | 0 | 0 | 0 | 0 | 0 | 19 |
| 7 | 0 | 0 | 0 | 0 | 0 | 0 | 0 | 0 | 0 | 0 | 0 | 0 | 0 |
| 0 | 7 | 0 | 0 | 0 | 0 | 0 | 0 | 0 | 0 | 0 | 0 | 0 | 0 |
| 0 | 0 | 7 | 0 | 0 | 0 | 0 | 0 | 0 | 0 | 0 | 0 | 0 | 0 |
| 0 | 0 | 0 | 7 | 0 | 0 | 0 | 0 | 0 | 0 | 0 | 0 | 0 | 0 |
| 0 | 0 | 0 | 0 | 7 | 0 | 0 | 0 | 0 | 0 | 0 | 0 | 0 | 0 |
| 0 | 0 | 0 | 0 | 0 | 7 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 |
| 0 | 7 | 0 | 0 | 0 | 0 | 0 | 0 | 0 | 0 | 0 | 0 | 0 | 0 |
| 0 | 0 | 7 | 0 | 0 | 0 | 0 | 0 | 0 | 0 | 0 | 0 | 0 | 0 |
| 0 | 0 | 0 | 7 | 0 | 0 | 0 | 0 | 0 | 0 | 0 | 0 | 0 | 0 |
| 7 | 7 | 7 | 7 | 19 | 19 | 19 | 19 | 19 | 19 | 19 | 19 | 19 | 19 |
| 2 | 3 | 4 | 5 | 6 | 7 | 1 | 2 | 3 | 4 | 5 | 6 | 7 | 8 |
| 13 | 14 | 15 | 16 | 17 | 18 | 19 | 20 | 21 | 22 | 23 | 24 | 25 | 26 |
| 3 | 3 | 3 | 3 | 2 | 2 | 1 | 1 | 1 | 1 | 1 | 1 | 1 | 1 |
| 1.625 | 1.750 | 1.875 | 2.000 | 2.125 | 2.250 | 2.375 | 2.500 | 2.625 | 2.750 | 2.875 | 3.000 | 3.125 | 3.250 |

FIG. 7 (Continued)

| | | | | | | | | | | | | | |
|---|---|---|---|---|---|---|---|---|---|---|---|---|---|
| | | | | | | | | | | | | | |
| 0 | 0 | 0 | 0 | 0 | 0 | 0 | 0 | 0 | 0 | 0 | 1 | 2 | 0 |
| 0 | 0 | 0 | 0 | 0 | 0 | 0 | 0 | 0 | 0 | 0 | 1 | 0 | 2 |
| 0 | 0 | 0 | 0 | 0 | 0 | 0 | 0 | 0 | 0 | 0 | 1 | 2 | 0 |
| 0 | 0 | 0 | 0 | 0 | 0 | 0 | 0 | 0 | 0 | 0 | 1 | 0 | 2 |
| 0 | 0 | 0 | 0 | 0 | 0 | 0 | 0 | 0 | 0 | 0 | 1 | 2 | 0 |
| 0 | 0 | 0 | 0 | 0 | 0 | 0 | 0 | 0 | 0 | 0 | 1 | 0 | 2 |
| 0 | 0 | 0 | 0 | 0 | 0 | 0 | 0 | 0 | 0 | 0 | 1 | 2 | 0 |
| 0 | 0 | 0 | 0 | 0 | 0 | 0 | 0 | 0 | 0 | 0 | 1 | 0 | 2 |
| 19 | 0 | 0 | 0 | 0 | 0 | 0 | 0 | 0 | 0 | 0 | 1 | 2 | 0 |
| 0 | 19 | 0 | 0 | 0 | 0 | 0 | 0 | 0 | 0 | 0 | 1 | 0 | 2 |
| 0 | 0 | 19 | 0 | 0 | 0 | 0 | 0 | 0 | 0 | 0 | 1 | 2 | 0 |
| 0 | 0 | 0 | 19 | 0 | 0 | 0 | 0 | 0 | 0 | 0 | 1 | 0 | 2 |
| 0 | 0 | 0 | 0 | 19 | 0 | 0 | 0 | 0 | 0 | 0 | 1 | 2 | 0 |
| 0 | 0 | 0 | 0 | 0 | 19 | 0 | 0 | 0 | 0 | 0 | 1 | 0 | 2 |
| 0 | 0 | 0 | 0 | 0 | 0 | 19 | 0 | 0 | 0 | 0 | 1 | 2 | 0 |
| 0 | 0 | 0 | 0 | 0 | 0 | 0 | 19 | 0 | 0 | 0 | 1 | 0 | 2 |
| 0 | 0 | 0 | 0 | 0 | 0 | 0 | 0 | 19 | 0 | 0 | 1 | 2 | 0 |
| 0 | 0 | 0 | 0 | 0 | 0 | 0 | 0 | 0 | 19 | 0 | 1 | 0 | 2 |
| 0 | 0 | 0 | 0 | 0 | 0 | 0 | 0 | 0 | 0 | 19 | 1 | 2 | 0 |
| 19 | 19 | 19 | 19 | 19 | 19 | 19 | 19 | 19 | 19 | 19 | 1 | 2 | 2 |
| 9 | 10 | 11 | 12 | 13 | 14 | 15 | 16 | 17 | 18 | 19 | 1 | 2 | 3 |
| 27 | 28 | 29 | 30 | 31 | 32 | 33 | 34 | 35 | 36 | 37 | 38 | 39 | 40 |
| 1 | 1 | 1 | 1 | 1 | 1 | 1 | 1 | 1 | 1 | 1 | 19 | 10 | 9 |
| 3.375 | 3.500 | 3.625 | 3.750 | 3.875 | 4.000 | 4.125 | 4.250 | 4.375 | 4.500 | 4.625 | 4.750 | 4.875 | 5.000 |

FIG. 7 (Continued)

800

| Base Station ID | | | | | | | | | | | | |
|---|---|---|---|---|---|---|---|---|---|---|---|---|
| 1 | 19 | 2 | 0 | 5 | 0 | 0 | 0 | 0 | 0 | 7 | 0 | 0 |
| 2 | 0 | 0 | 3 | 0 | 5 | 19 | 0 | 0 | 0 | 0 | 0 | 0 |
| 3 | 0 | 2 | 0 | 0 | 0 | 0 | 19 | 0 | 0 | 0 | 0 | 3 |
| 4 | 0 | 0 | 0 | 0 | 0 | 0 | 0 | 19 | 0 | 0 | 7 | 0 |
| 5 | 0 | 2 | 3 | 0 | 0 | 0 | 0 | 0 | 5 | 0 | 0 | 0 |
| 6 | 0 | 0 | 0 | 5 | 0 | 0 | 0 | 0 | 0 | 0 | 0 | 3 |
| 7 | 0 | 2 | 0 | 0 | 5 | 0 | 0 | 0 | 0 | 0 | 0 | 0 |
| 8 | 0 | 0 | 3 | 0 | 0 | 0 | 0 | 0 | 0 | 7 | 0 | 0 |
| 9 | 0 | 2 | 0 | 0 | 0 | 0 | 0 | 0 | 0 | 0 | 0 | 3 |
| 10 | 0 | 0 | 0 | 0 | 0 | 0 | 0 | 0 | 5 | 0 | 0 | 0 |
| 11 | 0 | 2 | 3 | 5 | 0 | 0 | 0 | 0 | 0 | 0 | 7 | 0 |
| 12 | 0 | 0 | 0 | 0 | 5 | 0 | 0 | 0 | 0 | 0 | 0 | 3 |
| 13 | 0 | 2 | 0 | 0 | 0 | 0 | 0 | 0 | 0 | 0 | 0 | 0 |
| 14 | 0 | 0 | 3 | 0 | 0 | 0 | 0 | 0 | 0 | 0 | 0 | 0 |
| 15 | 0 | 2 | 0 | 0 | 0 | 0 | 0 | 0 | 5 | 7 | 0 | 3 |
| 16 | 0 | 0 | 0 | 5 | 0 | 0 | 0 | 0 | 0 | 0 | 0 | 0 |
| 17 | 0 | 2 | 3 | 0 | 5 | 0 | 0 | 0 | 0 | 0 | 0 | 0 |
| 18 | 0 | 0 | 0 | 0 | 0 | 0 | 0 | 0 | 0 | 0 | 7 | 3 |
| 19 | 0 | 2 | 0 | 0 | 0 | 0 | 0 | 0 | 0 | 0 | 0 | 0 |
| PFR Zone Type | 19 | 2 | 3 | 5 | 5 | 19 | 19 | 19 | 5 | 7 | 7 | 3 |
| FTRB Permutation ID | 1 | 1 | 2 | 1 | 2 | 2 | 3 | 4 | 5 | 1 | 4 | 3 |
| Multiframe Index | 1 | 2 | 3 | 4 | 5 | 6 | 7 | 8 | 9 | 10 | 11 | 12 |
| Time (s) | 0.125 | 0.250 | 0.375 | 0.500 | 0.625 | 0.750 | 0.875 | 1.000 | 1.125 | 1.250 | 1.375 | 1.500 |

FIG. 8

| Example Frequency Time Resource Matrix (FTRM) - Type2 [1,2,3,5,7,19] | | | | | | | | | | | | | |
|---|---|---|---|---|---|---|---|---|---|---|---|---|---|
| 0 | 0 | 1 | 0 | 0 | 0 | 0 | 0 | 1 | 0 | 0 | 0 | 0 | 0 |
| 0 | 0 | 1 | 0 | 0 | 2 | 0 | 0 | 1 | 0 | 0 | 0 | 0 | 0 |
| 0 | 0 | 1 | 0 | 0 | 0 | 0 | 0 | 1 | 0 | 0 | 0 | 0 | 0 |
| 0 | 0 | 1 | 0 | 0 | 2 | 0 | 0 | 1 | 0 | 5 | 0 | 0 | 0 |
| 19 | 0 | 1 | 0 | 0 | 0 | 0 | 0 | 1 | 0 | 0 | 7 | 0 | 0 |
| 0 | 19 | 1 | 0 | 0 | 2 | 0 | 0 | 1 | 0 | 0 | 0 | 7 | 0 |
| 0 | 0 | 1 | 0 | 0 | 0 | 7 | 0 | 1 | 0 | 0 | 0 | 0 | 0 |
| 0 | 0 | 1 | 0 | 0 | 2 | 0 | 0 | 1 | 0 | 0 | 0 | 0 | 0 |
| 0 | 0 | 1 | 0 | 0 | 0 | 0 | 0 | 1 | 0 | 5 | 0 | 0 | 0 |
| 0 | 0 | 1 | 0 | 0 | 2 | 0 | 0 | 1 | 0 | 0 | 0 | 0 | 19 |
| 0 | 0 | 1 | 0 | 0 | 0 | 0 | 0 | 1 | 0 | 0 | 0 | 0 | 0 |
| 0 | 0 | 1 | 0 | 0 | 2 | 0 | 0 | 1 | 0 | 0 | 7 | 0 | 0 |
| 0 | 0 | 1 | 0 | 0 | 0 | 0 | 0 | 1 | 0 | 0 | 0 | 7 | 0 |
| 0 | 0 | 1 | 19 | 0 | 2 | 7 | 0 | 1 | 0 | 5 | 0 | 0 | 0 |
| 0 | 0 | 1 | 0 | 19 | 0 | 0 | 0 | 1 | 0 | 0 | 0 | 0 | 0 |
| 0 | 0 | 1 | 0 | 0 | 2 | 0 | 0 | 1 | 19 | 0 | 0 | 0 | 0 |
| 0 | 0 | 1 | 0 | 0 | 0 | 0 | 0 | 1 | 0 | 0 | 0 | 0 | 0 |
| 0 | 0 | 1 | 0 | 0 | 2 | 0 | 0 | 1 | 0 | 0 | 0 | 0 | 0 |
| 0 | 0 | 1 | 0 | 0 | 0 | 0 | 19 | 1 | 0 | 5 | 7 | 0 | 0 |
| 19 | 19 | 1 | 19 | 19 | 2 | 7 | 19 | 1 | 19 | 5 | 7 | 7 | 19 |
| 5 | 6 | 1 | 14 | 15 | 2 | 7 | 19 | 1 | 16 | 4 | 5 | 6 | 10 |
| 13 | 14 | 15 | 16 | 17 | 18 | 19 | 20 | 21 | 22 | 23 | 24 | 25 | 26 |
| 1.625 | 1.750 | 1.875 | 2.000 | 2.125 | 2.250 | 2.375 | 2.500 | 2.625 | 2.750 | 2.875 | 3.000 | 3.125 | 3.250 |

FIG. 8 (Continued)

| | | | | | | | | | | | | | |
|---|---|---|---|---|---|---|---|---|---|---|---|---|---|
| 0 | 0 | 3 | 0 | 0 | 0 | 0 | 0 | 0 | 7 | 0 | 0 | 0 | 0 |
| 0 | 0 | 0 | 0 | 0 | 2 | 7 | 0 | 0 | 0 | 0 | 0 | 0 | 0 |
| 7 | 0 | 0 | 0 | 0 | 0 | 0 | 0 | 0 | 0 | 0 | 5 | 0 | 0 |
| 0 | 0 | 3 | 0 | 0 | 2 | 0 | 0 | 0 | 0 | 0 | 0 | 0 | 0 |
| 0 | 0 | 0 | 5 | 0 | 0 | 0 | 0 | 0 | 0 | 0 | 0 | 0 | 0 |
| 0 | 0 | 0 | 0 | 0 | 2 | 0 | 0 | 0 | 0 | 0 | 0 | 0 | 7 |
| 0 | 0 | 3 | 0 | 0 | 0 | 0 | 0 | 0 | 0 | 0 | 0 | 19 | 0 |
| 0 | 19 | 0 | 0 | 0 | 2 | 7 | 0 | 0 | 7 | 0 | 5 | 0 | 0 |
| 0 | 0 | 0 | 0 | 0 | 0 | 0 | 0 | 0 | 0 | 19 | 0 | 0 | 0 |
| 7 | 0 | 3 | 5 | 0 | 2 | 0 | 0 | 0 | 0 | 0 | 0 | 0 | 0 |
| 0 | 0 | 0 | 0 | 0 | 0 | 0 | 0 | 19 | 0 | 0 | 0 | 0 | 0 |
| 0 | 0 | 0 | 0 | 0 | 2 | 0 | 19 | 0 | 0 | 0 | 0 | 0 | 0 |
| 0 | 0 | 3 | 0 | 19 | 0 | 0 | 0 | 0 | 0 | 0 | 5 | 0 | 7 |
| 0 | 0 | 0 | 0 | 0 | 2 | 0 | 0 | 0 | 0 | 0 | 0 | 0 | 0 |
| 0 | 0 | 0 | 5 | 0 | 0 | 0 | 0 | 0 | 7 | 0 | 0 | 0 | 0 |
| 0 | 0 | 3 | 0 | 0 | 2 | 7 | 0 | 0 | 0 | 0 | 0 | 0 | 0 |
| 7 | 0 | 0 | 0 | 0 | 0 | 0 | 0 | 0 | 0 | 0 | 0 | 0 | 0 |
| 0 | 0 | 0 | 0 | 0 | 2 | 0 | 0 | 0 | 0 | 0 | 5 | 0 | 0 |
| 0 | 0 | 3 | 0 | 0 | 0 | 0 | 0 | 0 | 0 | 0 | 0 | 0 | 0 |
| 7 | 19 | 3 | 5 | 19 | 2 | 7 | 19 | 19 | 7 | 19 | 5 | 19 | 7 |
| 3 | 8 | 1 | 5 | 13 | 2 | 2 | 12 | 11 | 1 | 9 | 3 | 7 | 6 |
| 27 | 28 | 29 | 30 | 31 | 32 | 33 | 34 | 35 | 36 | 37 | 38 | 39 | 40 |
| 3.375 | 3.500 | 3.625 | 3.750 | 3.875 | 4.000 | 4.125 | 4.250 | 4.375 | 4.500 | 4.625 | 4.750 | 4.875 | 5.000 |

FIG. 8 (Continued)

| Base Station ID | | | | | | | | | | | | |
|---|---|---|---|---|---|---|---|---|---|---|---|---|
| 1 | 1 | R | 2 | R | 3 | R | 5 | R | 7 | R | 0 | R |
| 2 | 1 | R | 0 | R | 0 | R | 0 | R | 0 | R | 7 | R |
| 3 | 1 | R | 2 | R | 0 | R | 0 | R | 0 | R | 0 | R |
| 4 | 1 | R | 0 | R | 3 | R | 0 | R | 0 | R | 0 | R |
| 5 | 1 | R | 2 | R | 0 | R | 0 | R | 0 | R | 0 | R |
| 6 | 1 | R | 0 | R | 0 | R | 5 | R | 0 | R | 0 | R |
| 7 | 1 | R | 2 | R | 3 | R | 0 | R | 0 | R | 0 | R |
| 8 | 1 | R | 0 | R | 0 | R | 0 | R | 7 | R | 0 | R |
| 9 | 1 | R | 2 | R | 0 | R | 0 | R | 0 | R | 7 | R |
| 10 | 1 | R | 0 | R | 3 | R | 0 | R | 0 | R | 0 | R |
| 11 | 1 | R | 2 | R | 0 | R | 5 | R | 0 | R | 0 | R |
| 12 | 1 | R | 0 | R | 0 | R | 0 | R | 0 | R | 0 | R |
| 13 | 1 | R | 2 | R | 3 | R | 0 | R | 0 | R | 0 | R |
| 14 | 1 | R | 0 | R | 0 | R | 0 | R | 0 | R | 0 | R |
| 15 | 1 | R | 2 | R | 0 | R | 0 | R | 7 | R | 0 | R |
| 16 | 1 | R | 0 | R | 3 | R | 5 | R | 0 | R | 7 | R |
| 17 | 1 | R | 2 | R | 0 | R | 0 | R | 0 | R | 0 | R |
| 18 | 1 | R | 0 | R | 0 | R | 0 | R | 0 | R | 0 | R |
| 19 | 1 | R | 2 | R | 3 | R | 0 | R | 0 | R | 0 | R |
| PFR Zone Type | 1 | 0 | 2 | 0 | 3 | 0 | 5 | 0 | 7 | 0 | 7 | 0 |
| FTRB Permutation | 1 | 0 | 1 | 0 | 1 | 0 | 1 | 0 | 1 | 0 | 2 | 0 |
| Multiframe Index | 1 | 2 | 3 | 4 | 5 | 6 | 7 | 8 | 9 | 10 | 11 | 12 |
| Time (s) | 0.05 | 0.10 | 0.15 | 0.20 | 0.25 | 0.30 | 0.35 | 0.40 | 0.45 | 0.50 | 0.55 | 0.60 |

FIG. 9

| Example Frequency Time Resource Matrix (FTRM) - Type 3 [1,2,3,5,7] | | | | | | | | | | | | | |
|---|---|---|---|---|---|---|---|---|---|---|---|---|---|
| 0 | R | 0 | R | 0 | R | 0 | R | 1 | R | 0 | R | 0 | R |
| 2 | R | 3 | R | 5 | R | 0 | R | 1 | R | 0 | R | 0 | R |
| 0 | R | 0 | R | 0 | R | 7 | R | 1 | R | 5 | R | 0 | R |
| 2 | R | 0 | R | 0 | R | 0 | R | 1 | R | 0 | R | 0 | R |
| 0 | R | 3 | R | 0 | R | 0 | R | 1 | R | 0 | R | 7 | R |
| 2 | R | 0 | R | 0 | R | 0 | R | 1 | R | 0 | R | 0 | R |
| 0 | R | 0 | R | 5 | R | 0 | R | 1 | R | 0 | R | 0 | R |
| 2 | R | 3 | R | 0 | R | 0 | R | 1 | R | 5 | R | 0 | R |
| 0 | R | 0 | R | 0 | R | 0 | R | 1 | R | 0 | R | 0 | R |
| 2 | R | 0 | R | 0 | R | 7 | R | 1 | R | 0 | R | 0 | R |
| 0 | R | 3 | R | 0 | R | 0 | R | 1 | R | 0 | R | 0 | R |
| 2 | R | 0 | R | 5 | R | 0 | R | 1 | R | 0 | R | 7 | R |
| 0 | R | 0 | R | 0 | R | 0 | R | 1 | R | 5 | R | 0 | R |
| 2 | R | 3 | R | 0 | R | 0 | R | 1 | R | 0 | R | 0 | R |
| 0 | R | 0 | R | 0 | R | 0 | R | 1 | R | 0 | R | 0 | R |
| 2 | R | 0 | R | 0 | R | 0 | R | 1 | R | 0 | R | 0 | R |
| 0 | R | 3 | R | 5 | R | 7 | R | 1 | R | 0 | R | 0 | R |
| 2 | R | 0 | R | 0 | R | 0 | R | 1 | R | 5 | R | 0 | R |
| 0 | R | 0 | R | 0 | R | 0 | R | 1 | R | 0 | R | 7 | R |
| 2 | 0 | 3 | 0 | 5 | 0 | 7 | 0 | 1 | 0 | 5 | 0 | 7 | 0 |
| 2 | 0 | 2 | 0 | 2 | 0 | 3 | 0 | 1 | 0 | 3 | 0 | 5 | 0 |
| 13 | 14 | 15 | 16 | 17 | 18 | 19 | 20 | 21 | 22 | 23 | 24 | 25 | 26 |
| 0.65 | 0.70 | 0.75 | 0.80 | 0.85 | 0.90 | 0.95 | 1.00 | 1.05 | 1.10 | 1.15 | 1.20 | 1.25 | 1.30 |

FIG. 9 (Continued)

900

| | | | | | | | | | | | | | |
|---|---|---|---|---|---|---|---|---|---|---|---|---|---|
| 0 | R | 0 | R | 0 | R | 0 | R | 0 | R | 0 | R | 2 | R |
| 0 | R | 0 | R | 0 | R | 0 | R | 0 | R | 0 | R | 0 | R |
| 0 | R | 0 | R | 3 | R | 0 | R | 0 | R | 0 | R | 2 | R |
| 5 | R | 0 | R | 0 | R | 0 | R | 0 | R | 7 | R | 0 | R |
| 0 | R | 0 | R | 0 | R | 5 | R | 0 | R | 0 | R | 2 | R |
| 0 | R | 7 | R | 3 | R | 0 | R | 0 | R | 0 | R | 0 | R |
| 0 | R | 0 | R | 0 | R | 0 | R | 7 | R | 0 | R | 2 | R |
| 0 | R | 0 | R | 0 | R | 0 | R | 0 | R | 0 | R | 0 | R |
| 5 | R | 0 | R | 3 | R | 0 | R | 0 | R | 0 | R | 2 | R |
| 0 | R | 0 | R | 0 | R | 5 | R | 0 | R | 0 | R | 0 | R |
| 0 | R | 0 | R | 0 | R | 0 | R | 0 | R | 7 | R | 2 | R |
| 0 | R | 0 | R | 3 | R | 0 | R | 0 | R | 0 | R | 0 | R |
| 0 | R | 7 | R | 0 | R | 0 | R | 0 | R | 0 | R | 2 | R |
| 5 | R | 0 | R | 0 | R | 0 | R | 7 | R | 0 | R | 0 | R |
| 0 | R | 0 | R | 3 | R | 5 | R | 0 | R | 0 | R | 2 | R |
| 0 | R | 0 | R | 0 | R | 0 | R | 0 | R | 0 | R | 0 | R |
| 0 | R | 0 | R | 0 | R | 0 | R | 0 | R | 0 | R | 2 | R |
| 0 | R | 0 | R | 3 | R | 0 | R | 0 | R | 7 | R | 0 | R |
| 5 | R | 0 | R | 0 | R | 0 | R | 0 | R | 0 | R | 2 | R |
| 5 | 0 | 7 | 0 | 3 | 0 | 5 | 0 | 7 | 0 | 7 | 0 | 2 | 0 |
| 4 | 0 | 6 | 0 | 3 | 0 | 5 | 0 | 7 | 0 | 4 | 0 | 1 | 0 |
| 27 | 28 | 29 | 30 | 31 | 32 | 33 | 34 | 35 | 36 | 37 | 38 | 39 | 40 |
| 1.35 | 1.40 | 1.45 | 1.50 | 1.55 | 1.60 | 1.65 | 1.70 | 1.75 | 1.80 | 1.85 | 1.90 | 1.95 | 2.00 |

FIG. 9 (Continued)

| Base Station ID | | | | | | | | | | | | |
|---|---|---|---|---|---|---|---|---|---|---|---|---|
| 1 | 1 | R | 2 | 0 | 3 | R | 5 | 0 | 7 | R | 0 | 2 |
| 2 | 1 | R | 0 | 0 | 0 | R | 0 | 0 | 0 | R | 7 | 0 |
| 3 | 1 | R | 2 | 0 | 0 | R | 0 | 5 | 0 | R | 0 | 2 |
| 4 | 1 | R | 0 | 0 | 3 | R | 0 | 0 | 0 | R | 0 | 0 |
| 5 | 1 | R | 2 | 0 | 0 | R | 0 | 0 | 0 | R | 0 | 2 |
| 6 | 1 | R | 0 | 7 | 0 | R | 5 | 0 | 0 | R | 0 | 0 |
| 7 | 1 | R | 2 | 0 | 3 | R | 0 | 0 | 0 | R | 0 | 2 |
| 8 | 1 | R | 0 | 0 | 0 | R | 0 | 5 | 7 | R | 0 | 0 |
| 9 | 1 | R | 2 | 0 | 0 | R | 0 | 0 | 0 | R | 7 | 2 |
| 10 | 1 | R | 0 | 0 | 3 | R | 0 | 0 | 0 | R | 0 | 0 |
| 11 | 1 | R | 2 | 0 | 0 | R | 5 | 0 | 0 | R | 0 | 2 |
| 12 | 1 | R | 0 | 0 | 0 | R | 0 | 0 | 0 | R | 0 | 0 |
| 13 | 1 | R | 2 | 7 | 3 | R | 0 | 5 | 0 | R | 0 | 2 |
| 14 | 1 | R | 0 | 0 | 0 | R | 0 | 0 | 0 | R | 0 | 0 |
| 15 | 1 | R | 2 | 0 | 0 | R | 0 | 0 | 7 | R | 0 | 2 |
| 16 | 1 | R | 0 | 0 | 3 | R | 5 | 0 | 0 | R | 7 | 0 |
| 17 | 1 | R | 2 | 0 | 0 | R | 0 | 0 | 0 | R | 0 | 2 |
| 18 | 1 | R | 0 | 0 | 0 | R | 0 | 5 | 0 | R | 0 | 0 |
| 19 | 1 | R | 2 | 0 | 3 | R | 0 | 0 | 0 | R | 0 | 2 |
| PFR Zone Type | 1 | 0 | 2 | 7 | 3 | 0 | 5 | 5 | 7 | 0 | 7 | 2 |
| FTRB Permutation | 1 | 0 | 1 | 6 | 1 | 0 | 1 | 3 | 1 | 0 | 2 | 1 |
| Multiframe Index | 1 | 2 | 3 | 4 | 5 | 6 | 7 | 8 | 9 | 10 | 11 | 12 |
| Time (s) | 0.05 | 0.10 | 0.15 | 0.20 | 0.25 | 0.30 | 0.35 | 0.40 | 0.45 | 0.50 | 0.55 | 0.60 |

FIG. 10

| Example Frequency Time Resource Matrix (FTRM) - Type 3 [1,2,3,5,7] | | | | | | | | | | | | | |
|---|---|---|---|---|---|---|---|---|---|---|---|---|---|
| 0 | R | 0 | 0 | 0 | R | 0 | 3 | 1 | R | 0 | 0 | 0 | R |
| 2 | R | 3 | 0 | 5 | R | 0 | 0 | 1 | R | 0 | 7 | 0 | R |
| 0 | R | 0 | 5 | 0 | R | 7 | 0 | 1 | R | 5 | 0 | 0 | R |
| 2 | R | 0 | 0 | 0 | R | 0 | 3 | 1 | R | 0 | 0 | 0 | R |
| 0 | R | 3 | 0 | 0 | R | 0 | 0 | 1 | R | 0 | 0 | 7 | R |
| 2 | R | 0 | 0 | 0 | R | 0 | 0 | 1 | R | 0 | 0 | 0 | R |
| 0 | R | 0 | 0 | 5 | R | 0 | 3 | 1 | R | 0 | 0 | 0 | R |
| 2 | R | 3 | 5 | 0 | R | 0 | 0 | 1 | R | 5 | 0 | 0 | R |
| 0 | R | 0 | 0 | 0 | R | 0 | 0 | 1 | R | 0 | 7 | 0 | R |
| 2 | R | 0 | 0 | 0 | R | 7 | 3 | 1 | R | 0 | 0 | 0 | R |
| 0 | R | 3 | 0 | 0 | R | 0 | 0 | 1 | R | 0 | 0 | 0 | R |
| 2 | R | 0 | 0 | 5 | R | 0 | 0 | 1 | R | 0 | 0 | 7 | R |
| 0 | R | 0 | 5 | 0 | R | 0 | 3 | 1 | R | 5 | 0 | 0 | R |
| 2 | R | 3 | 0 | 0 | R | 0 | 0 | 1 | R | 0 | 0 | 0 | R |
| 0 | R | 0 | 0 | 0 | R | 0 | 0 | 1 | R | 0 | 0 | 0 | R |
| 2 | R | 0 | 0 | 0 | R | 0 | 3 | 1 | R | 0 | 7 | 0 | R |
| 0 | R | 3 | 0 | 5 | R | 7 | 0 | 1 | R | 0 | 0 | 0 | R |
| 2 | R | 0 | 5 | 0 | R | 0 | 0 | 1 | R | 5 | 0 | 0 | R |
| 0 | R | 0 | 0 | 0 | R | 0 | 3 | 1 | R | 0 | 0 | 7 | R |
| 2 | 0 | 3 | 5 | 5 | 0 | 7 | 3 | 1 | 0 | 5 | 7 | 7 | 0 |
| 2 | 0 | 2 | 3 | 2 | 0 | 3 | 1 | 1 | 0 | 3 | 2 | 5 | 0 |
| 13 | 14 | 15 | 16 | 17 | 18 | 19 | 20 | 21 | 22 | 23 | 24 | 25 | 26 |
| 0.65 | 0.70 | 0.75 | 0.80 | 0.85 | 0.90 | 0.95 | 1.00 | 1.05 | 1.10 | 1.15 | 1.20 | 1.25 | 1.30 |

FIG. 10 (Continued)

1000

| | | | | | | | | | | | | | |
|---|---|---|---|---|---|---|---|---|---|---|---|---|---|
| 0 | 5 | 0 | R | 0 | 0 | 0 | R | 0 | 0 | 0 | 1 | 2 | R |
| 0 | 0 | 0 | R | 0 | 3 | 0 | R | 0 | 0 | 0 | 1 | 0 | R |
| 0 | 0 | 0 | R | 3 | 0 | 0 | R | 0 | 7 | 0 | 1 | 2 | R |
| 5 | 0 | 0 | R | 0 | 0 | 0 | R | 0 | 0 | 7 | 1 | 0 | R |
| 0 | 0 | 0 | R | 0 | 3 | 5 | R | 0 | 0 | 0 | 1 | 2 | R |
| 0 | 5 | 7 | R | 3 | 0 | 0 | R | 0 | 0 | 0 | 1 | 0 | R |
| 0 | 0 | 0 | R | 0 | 0 | 0 | R | 7 | 0 | 0 | 1 | 2 | R |
| 0 | 0 | 0 | R | 0 | 3 | 0 | R | 0 | 0 | 0 | 1 | 0 | R |
| 5 | 0 | 0 | R | 3 | 0 | 0 | R | 0 | 0 | 0 | 1 | 2 | R |
| 0 | 0 | 0 | R | 0 | 0 | 5 | R | 0 | 7 | 0 | 1 | 0 | R |
| 0 | 5 | 0 | R | 0 | 3 | 0 | R | 0 | 0 | 7 | 1 | 2 | R |
| 0 | 0 | 0 | R | 3 | 0 | 0 | R | 0 | 0 | 0 | 1 | 0 | R |
| 0 | 0 | 7 | R | 0 | 0 | 0 | R | 0 | 0 | 0 | 1 | 2 | R |
| 5 | 0 | 0 | R | 0 | 3 | 0 | R | 7 | 0 | 0 | 1 | 0 | R |
| 0 | 0 | 0 | R | 3 | 0 | 5 | R | 0 | 0 | 0 | 1 | 2 | R |
| 0 | 5 | 0 | R | 0 | 0 | 0 | R | 0 | 0 | 0 | 1 | 0 | R |
| 0 | 0 | 0 | R | 0 | 3 | 0 | R | 0 | 7 | 0 | 1 | 2 | R |
| 0 | 0 | 0 | R | 3 | 0 | 0 | R | 0 | 0 | 7 | 1 | 0 | R |
| 5 | 0 | 0 | R | 0 | 0 | 0 | R | 0 | 0 | 0 | 1 | 2 | R |
| 5 | 5 | 7 | 0 | 3 | 3 | 5 | 0 | 7 | 7 | 7 | 1 | 2 | 0 |
| 4 | 1 | 6 | 0 | 3 | 2 | 5 | 0 | 7 | 3 | 4 | 1 | 1 | 0 |
| 27 | 28 | 29 | 30 | 31 | 32 | 33 | 34 | 35 | 36 | 37 | 38 | 39 | 40 |
| 1.35 | 1.40 | 1.45 | 1.50 | 1.55 | 1.60 | 1.65 | 1.70 | 1.75 | 1.80 | 1.85 | 1.90 | 1.95 | 2.00 |

FIG. 10 (Continued)

PARTIAL FREQUENCY TIME RESOURCE REUSE COORDINATION FOR INTERFERENCE MITIGATION IN FREQUENCY REUSE RADIO NETWORKS

CROSS-REFERENCE TO RELATED APPLICATIONS

The present application is related to and claims benefit under 35 U.S.C. § 119 (e) from U.S. Provisional Patent Application Ser. No. 63/336,536, filed Apr. 29, 2022, entitled "Partial Frequency Time Resource Reuse Coordination for Interference Mitigation in Frequency Reuse Radio Networks," the entire contents of which is incorporated herein by reference.

BACKGROUND OF THE INVENTION

Utilities, for example, electric utilities, use wireless data communication networks to connect smart devices for monitoring and controlling their infrastructure. For example, electric usage meters, sensors, and other devices may provide telemetry data to automated billing and monitoring systems for an electric utility. Increasingly, such communications are two-way, for example, when used for controlling smart electric grids using distributed automation. Such wireless communication networks may include hundreds of base stations communicating with thousands of end nodes using limited radiofrequency spectrum.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 4 is a table illustrating aspects of the operation of the system of FIG. 1 in accordance with some embodiments.

FIG. 5 is a table illustrating aspects of the operation of the system of FIG. 1 in accordance with some embodiments.

FIG. 7 is a table illustrating an example frequency time resource matrix for the system of FIG. 1 in accordance with some embodiments.

FIG. 8 is a table illustrating an example frequency time resource matrix for the system of FIG. 1 in accordance with some embodiments.

FIG. 9 is a table illustrating an example frequency time resource matrix for the system of FIG. 1 in accordance with some embodiments.

FIG. 10 is a table illustrating an example frequency time resource matrix for the system of FIG. 1 in accordance with some embodiments.

Figure 1:
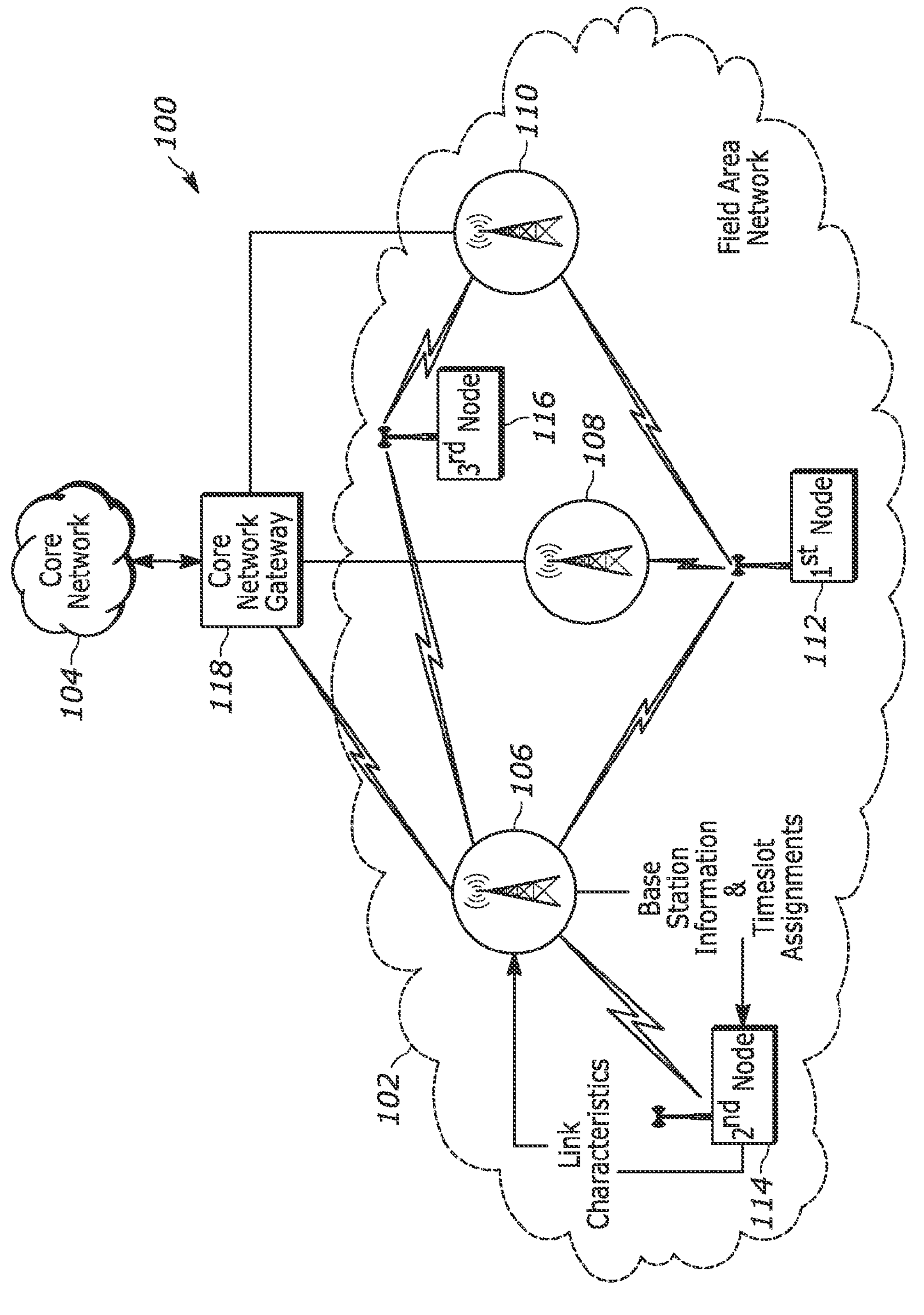
FIG. 1 illustrates a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

In some instances, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, electric utilities may deploy short packet wireless communication networks including hundreds of low power base stations communicating with thousands of end nodes using limited radiofrequency spectrum. When multiple base stations operate in the same geographic area using the same shared or adjacent frequencies, interference may result. Some network architectures utilize a single or multiple frequency reuse radio channel architecture without any system self-interference coordination. Even where such networks operate using carrier-sense multiple access (CSMA) protocols, collisions and interference result. Because the networks are low power and highly populated, some end nodes can communicate with one or more base stations, but cannot directly communicate with other end nodes (i.e., the "hidden node problem"). Without the ability to determine whether another transmission is in progress, end nodes essentially operate in an ALOHA protocol-like other random access mode. Furthermore, "hidden nodes" are also unable to detect collisions, rendering any collision-detection protocols less effective. Even if all end nodes can hear all other end nodes, listening before transmitting is inefficient and leads to reduced throughput even in cases where it reduces interference. Therefore, systems and methods are needed to mitigate interference effects to increase system throughput while sharing a single frequency.

To address these problems and for other reasons, systems and methods are provided herein for coordinating the partial reuse of frequency time resources (FTRs) to mitigate interference. Among other things, embodiments described herein assign FTRs to be used by base stations and end nodes for radio transmissions based on radiofrequency signal characteristics, e.g., radiofrequency distances between the base stations and end nodes. The radiofrequency distance between an end node and a base station can be quantified as on one or more of a geographic distance, a received signal strength indication (RSSI), a pathloss value, a signal to interference ratio threshold, a calculated or measured signal to interference ratio or signal to interference and noise ratio, and the like. In some aspects, an end node may determine RF pathloss to its serving base station and report the pathloss and other link characteristics to the base station. The base station receives this information and similar information for each end node it serves. Using the information, the base station determines a partial FTR reuse (PFR) interference zone for each end node and uses the zone to assign uplink and downlink paths for the end node, using either random or scheduled access channels. Some embodiments described herein provide for an end node making interference zone determinations for itself and reporting the determinations to a serving base station. In some aspects, an end node begins operation using a default PFR interference zone (e.g., initially assigned by a base station or hard-coded in the end node) and operates using the default PFR interference zone until a subsequent zone is determined (e.g., by the end node or its serving base station).

Using such embodiments, radiofrequency communications solution networks can still utilize a single frequency reuse radio channel architecture but will implement the partial frequency time resource reuse to mitigate system self-interference. Using embodiments described herein significantly reduces harmful collisions because devices are only permitted to transmit during specific windows based on a radiofrequency distance metric. Such embodiments also greatly increase network capacity by permitting controlled frequency reuse which increases the amount of "virtual" spectrum. Using such embodiments, the effect of interference is reduced, and network throughput is increased. This, in turn, leads to a more spectrally efficient and effective use of the network.

One example embodiment provides a wireless base station. The wireless base station includes an electronic processor and a transceiver coupled to the electronic processor. The electronic processor is configured to transmit, via the transceiver, a first network message including a transmit power level for the wireless base station and an identifier for the wireless base station. The electronic processor is configured to receive, via the transceiver, a second network message from an end node, the second network message including the identifier and a radiofrequency signal characteristic for the end node: select an interference coordination zone for the end node based on the radiofrequency characteristic for the end node. The electronic processor is configured to select a frequency time resource for the end node based on the interference coordination zone. The electronic processor is configured to transmit, via the transceiver, a third network message to the end node, the third network message including the frequency time resource.

Another example embodiment provides a method for operating a wireless base station. The method includes transmitting, via a transceiver, a first network message including a transmit power level for the wireless base station and an identifier for the wireless base station. The method includes receiving, via the transceiver, a second network message from an end node, the second network message including the identifier and a radiofrequency signal characteristic for the end node. The method includes selecting, with an electronic processor, an interference coordination zone for the end node based on the radiofrequency characteristic for the end node. The method includes selecting, with the electronic processor, a frequency time resource for the end node based on the interference coordination zone. The method includes transmitting, via the transceiver, a third network message to the end node, the third network message including the frequency time resource.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a diagram of one example embodiment of a communication system 100, which is configured to, among other things, implement a partial frequency time resource reuse scheme to mitigate system self-interference. In the example illustrated, the system 100 includes a field area network 102 and a core network 104. In the illustrated example, the field area network 102 is a radio area network including a first base station 106, a second base station 108, a third base station 110, a first end node 112, a second end node 114, and a third end node 116. In one example, the field area network 102 is low power short packet wireless communication network deployed to monitor and control equipment on an electric utility grid and the core network 104 is a back end computing network for the electric utility (including, for example, billing systems, grid monitoring systems, and other command and control for the electric grid). The first end node 112, the second end node 114, and the third end node 116 each include appropriate hardware and software components (e.g., electronic processors, memories, transceivers) for operating the end nodes as described herein.

In the example illustrated, the field area network 102 is communicatively coupled to the core network 104 by a core network gateway 118. For example, each of the first base station 106, the second base station 108, and the third base station 110 are coupled to the core network gateway 118 via a suitable wired or wireless backhaul connection. The core network gateway 118 includes hardware and software components (e.g., electronic processors, memories, transceivers) for controlling electronic communications between the field area network 102 and the core network 104. In some embodiments, the core network 104 may be a cloud computing platform accessible via one or more networks, including over the Internet using encrypted tunnels or another secure virtual network connection.

Figure 2:
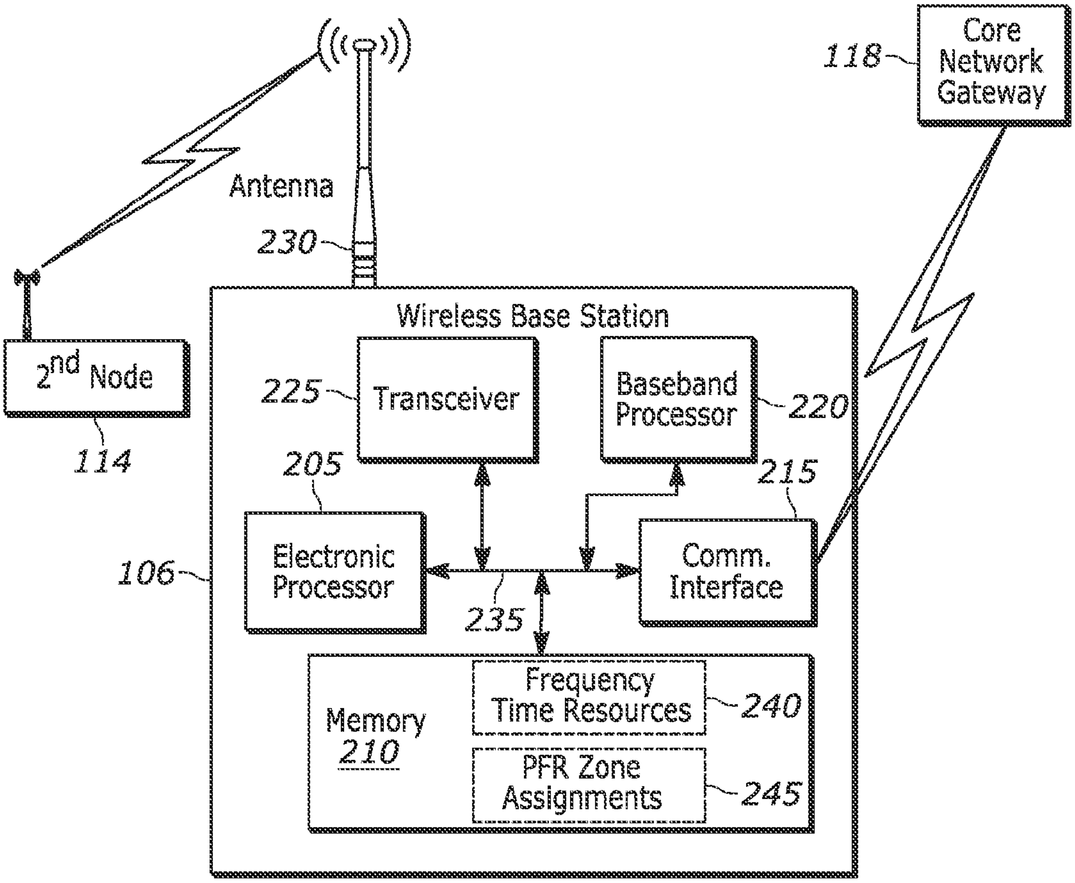
FIG. 2 is a diagram of a wireless base station of the system of FIG. 1 in accordance with some embodiments.

The first base station 106, the second base station 108, and the third base station 110, described more particularly with respect to FIG. 2, are wireless base stations for operating the field area network 102 to provide wireless communications to, from, and between the first end node 112, the second end node 114, and the third end node 116. In some instances, a base station of the field area network 102 may be referred to herein or in the accompanying figures as a "field network gateway" or an "FNG."

The system 100 may include more components than those illustrated. In particular, it should be understood that, although FIG. 1 illustrates only three base stations and three end nodes, the system 100 may include a field area network servicing tens, hundreds, or even thousands of end nodes with hundreds of base stations.

In one example, the field area network 102 is a single frequency reuse network operating in the 450-470 MHz band using 12.5 kHz channels to provide narrowband packet-based data communications between 5 and 10 kbps.

In one example, each of the base stations in the field area network 102 is configured to transmit data to the end nodes on a single downlink channel and receive data from the end nodes on one of many uplink channels, where the uplink and downlink frequencies are the same for each base station. Likewise, each of the end nodes is configured to receive data using the same downlink channel and transmit data on the same uplink channels. In some instances, the field area network 102 operates in geographic proximity to other users using the same or adjacent frequencies allocated from the same band as the field area network downlink and uplink channels.

As illustrated in FIG. 1, an end node may be able transmit signals that can be received by multiple base stations and, likewise, be able to receive signals transmitted from multiple base stations. For example, the first end node 112 is able to communicate with all three base stations, whereas the second end node 114 is only able to communicate with the first base station 106, and the third end node 116 is able to communicate with the first base station 106 and the third base station 110, but not the second base station 108. In some instances, an end node may be able to receive transmissions from a particular base station but may be unable to send transmissions receivable by that base station. In some instances, an end node may be able to send transmissions receivable by a particular base station but be unable to receive transmissions from that base station.

Accordingly, each of the end nodes in the field area network 102 are associated with a particular base station, known as that end node's "serving base station." Each base station in the field area network 102 is configured with a unique identifier, which is used to distinguish the base station within the field area network 10. An end node's serving base station is the base station, to which that end node attempts to listen, and to which it transmits its data, using the unique identifier.

In some embodiments, an end node is configured with a default serving base station identifier when it is first deployed. For example, a group of end nodes and a new base station may be installed in a residential neighborhood at the same time, with all of the end nodes configured with the new base station as their serving base station. In some embodiments, an end node selects its serving base station based on, among other things, radiofrequency conditions between a base station and the end node. In some embodiments, end nodes are configured to switch base station when conditions warrant. For example, an end node's radio channel conditions (to its serving base station) may degrade so much that it terminates its reservation on the existing serving base station and selects a different base station to provide an acceptable quality of service.

As an example, FIG. 1 is illustrated with the second end node 114 having as its serving base station the first base station 106. Although the other end nodes have their respective serving base stations, such relationships are not shown. As illustrated in FIG. 1, and described herein, the first base station 106 sends information about itself (e.g., transmission power levels and its identifier) and timeslot assignments to the second end node 114, and the second end node 114 send link characteristics (e.g., link pathloss) to the first base station 106.

Scheduling transmissions using FTRs requires that base stations and end nodes are time synchronized. In some embodiments, the base stations are configured to maintain network timing by periodically transmitting a timing beacon, which is used by the end nodes to synchronize their data transmissions.

FIG. 2 schematically illustrates one example embodiment of the first base station 106. In the embodiment illustrated, the base station 106 includes an electronic processor 205, a memory 210, a communication interface 215, a baseband processor 220, a transceiver 225, and an antenna 230. The illustrated components, along with other various modules and components are coupled to each other by or through one or more control or data buses (for example, the bus 235) that enable communication therebetween.

The electronic processor 205 may include one or more microprocessors, an application-specific integrated circuit (ASIC), or another suitable electronic device. The electronic processor 205 obtains and provides information (e.g., to and from the memory 210 and/or the communication interface 215) and processes the information by executing one or more software instructions or modules, capable of being stored, for example, in a random access memory ("RAM") area of the memory 210, a read only memory ("ROM") of the memory 210, or another non-transitory computer readable medium (not shown). The software can include firmware, one or more applications, program data, filters, rules, one or more program modules, and other executable instructions. In the embodiment illustrated, the memory 210 stores, among other things, frequency time resources 240) and PFR zone assignments 245 (both described in detail herein).

The electronic processor 205 is configured to retrieve from the memory 210 and execute, among other things, software related to the control processes and methods described herein. The electronic processor 205 executes instructions stored in the memory 210 to implement functionality of the first field network gateway 118.

The electronic processor 205 is configured to control the baseband processor 220 and the transceiver 225 to transmit and receive radiofrequency signals to and from the second end node 114 (and/or other end nodes) using the antenna 230. It should be noted that many base stations and other communication devices typically employ multiple antennas in practice, to realize spatial diversity (e.g., MIMO). The electronic processor 205, the baseband processor 220, and the transceiver 225 may include various digital and analog components (for example, digital signal processors, high band filters, low band filters, and the like), which for brevity are not described herein and which may be implemented in hardware, software, or a combination of both. In some embodiments, the transceiver 225 is a combined transmitter-receiver component. In other embodiments the transceiver 225 includes or may be replaced by separate transmitter and receiver components.

The electronic processor 205 is configured to control the communication interface 215 (and, in some embodiments, the antenna 230, another antenna (not shown), or a suitable wired connection) to transmit and receive communication signals to and from the core network gateway 118.

The description of base station 106 is provided as a representative example of other base stations deployed in the network, including base stations 108 and 110. In some aspects, one or more of the end nodes and the core network gateway 118, although they may not have identical functions and capabilities, include systems or devices having a similar general component configuration as the base station 106, in that they each include a respective electronic processor, memory, communication interface, input/output interface, and/or radiofrequency communication components coupled by at least one communication bus.

Figure 3:
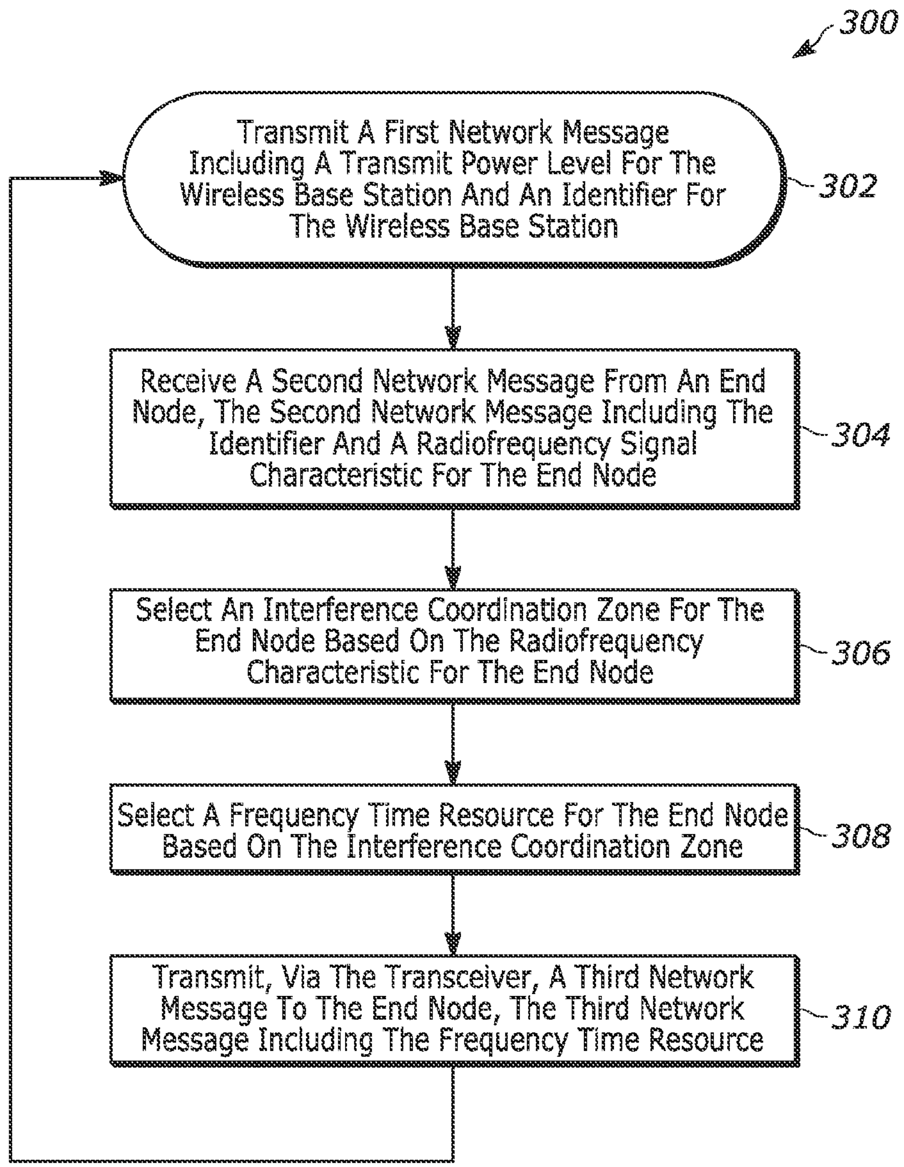
FIG. 3 is a flowchart illustrating a method for partial frequency time resource reuse coordination for interference mitigation in accordance with some embodiments.

As noted, there is a need for system self-interference coordination in wireless data networks. Accordingly, FIG. 3 illustrates an example method 300 for coordinating the partial reuse of frequency time resources (FTRs) to mitigate interference in such networks by dynamically scheduling base station and end node radio transmissions or allocating random access FTRs based on radiofrequency distance and/or other characteristics for the base stations and end nodes. Although the method 300 is described in conjunction with the system 100 as described herein, the method 300 may be used with other systems and devices. In addition, the method 300 may be modified or performed differently than the specific example provided.

By way of example, the method 300 is described as being performed by the first base station 106 and, in particular, the electronic processor 205. However, it should be understood that, in some embodiments, all or portions of the method 300 may be performed by other devices, including for example, the core network gateway 118, one of the end nodes, of combinations of the foregoing. In some examples, performance of the method 300 may be distributed among components of the field area network 102. Additional electronic processors may also be included in the first base station 106 or other control equipment for the field area network 102 (not shown) that perform all or a portion of the method 300. For ease of description, the method 300 is described partially in terms of a single base station and a single end node. However, the method 300 may be applied to systems including multiple base stations and end nodes.

The method 300 begins, at block 302, with the electronic processor 205 transmitting (e.g., via the transceiver 225) a first network message including a transmit power level for the wireless base station and an identifier for the wireless base station. For example, the network message may be a packet broadcast to end nodes in the field area network 102. In some embodiments, the network message may be a unicast message (for example, where subsequent messages (see block 304) are not received, the base station may attempt to contact known end nodes using unicast messaging). In some embodiments, the network message may be a control protocol message, communicated using a control layer of the protocol stack utilized by the field area network. In some embodiments, the network message may not be a dedicated message type, but rather an ordinary network packet (for example, where the packet header includes a field for specifying the transmit power level. The identifier is a value (e.g., a numeric or alphanumeric value) assigned to the base station to uniquely identify it within the field area network 102. In some embodiments, the first network message is periodically transmitted such that it may be received by new end nodes as they come online and existing end nodes as they continually track their dynamic link conditions. In some embodiments, the wireless base station operates according to dynamic power control. In such embodiments, changes in the wireless base station transmit power levels may trigger the generation and transmission of new network messages including the new transmit power levels.

In some embodiments, the first network message or another network message may be used to statically assign a default interference coordination zone, which the end node is to use until a subsequent interference coordination zone is dynamically determined and/or assigned, as described below. For example, a network policy or desired quality of service may be used to predetermine default interference coordination zones for the end nodes. In some aspects, a single default interference coordination zone may be assigned network-wide. In other aspects, different default interference coordination zones may be assigned to different base stations and end nodes. In some aspects, a default interference coordination zone is determined for an end node using an out of band interference coordination zone determination made for the end node based on radiofrequency distance analysis and/or measurements (e.g., using geographic location, external radiofrequency coverage analysis, field survey data, external data analysis, and the like).

In some aspects, the base station sends a first network message (or subsequent network messages) that includes, in addition to the transmit power level for the base station, an indication of whether or not the base station is using dynamic power control. When a base station indicates that the dynamic power control is not enabled, it in turn indicates that the same transmit power level is used for all messages from that base station. As such, an end node may make radiofrequency distance determinations from any message received from the base station, rather than just the first network message. This affords end nodes more opportunities to calculate radiofrequency distances, enabling more frequent zone determinations. This, in turn, allows the network to more rapidly account for changing conditions.

At block 304, the electronic processor 205 receives (e.g., via the transceiver 225) a second network message (e.g., a packet) from an end node. As noted, the method 300 is applicable to a base station operating to communicate with many end nodes. For ease of description, interaction with only one end node is described here. It should be understood that a base station transmitting messages (at block 302) may receive messages from many end nodes in response.

The second network message includes at least the identifier (sent at block 302) and a radiofrequency signal characteristic (e.g., a radiofrequency distance) for the end node. For example, an end node receiving the first network message may compare a received signal strength indication (RSSI) measured at the time the first network message was received to determine a pathloss for the downlink from the base station to the end node. The downlink pathloss may be used by the end node to estimate the uplink pathloss.

In some embodiments, the uplink channel radiofrequency characteristic may be determined by sounding. For example, the serving base station may issue a network command message to the end node to transmit test messages, which are measured by the serving base station and other base stations on the network. Test messages may be broadcast messages or unicast messages sent to particular base stations. The other base stations on the network forward measurements of the test signal to the serving base station, where the measurements may be used to determine a radiofrequency distance for the end node, which in turn may be used to assign an interference coordination zone, as described herein.

In some alternative embodiments, end nodes are configured to periodically transmit well known uplink signals to the base stations, which the base stations use to measure and derive uplink channel characteristics (e.g., pathloss). In such embodiments, the network characteristics for the end node are determined by the base station and not reported by the end node.

As noted, an end node may be able to receive radio transmissions from more than one base station in the network. In some embodiments, the second network message may include identifiers and radiofrequency characteristics for the end node associated with multiple base stations. For example, FIG. 4 is a table 400 that includes pathloss values (col. 402) for nineteen base stations (col. 404, labeled 1-19). The rows of table 400 are ordered according to the pathloss values (in ascending order). In this example, it is for simplicity's sake and purely coincidental that the base station identifiers in column 404 also appear in ascending order (in a real-world environment, it is unlikely that the pathloss values and identifiers would align). A pathloss value of 999 is not an actual measured value, but instead indicates that the end node is not receiving messages from that base station. In the example illustrated, base station ID 1 is the serving base station for the end node (at a 90 dB pathloss, its signal is the strongest one received). Column 406 lists the signal to interference ratios (SIR) (relative to the pathloss for the serving base station) for each base station. Column 408 indicates, in binary fashion, whether other end nodes transmitted to the base station for that row would interfere with the end node's ability to receive a signal from the serving base station. In the example illustrated, interference is predicted using a 20 dB SIR threshold. FIG. 5 illustrates a table 500, which is similar to the table 400. The table 500 includes pathloss values (col. 502) for nineteen base stations (col. 504, labeled 1-19), as well as SIR values (col. 506) and indications of interference (col. 508).

Returning to FIG. 3, at block 306, the electronic processor 205 selects an interference coordination zone for the end node based on the radiofrequency characteristic for the end node. An interference coordination zone may also be referred to herein as a partial FTR reuse zone (PFR zone). Each interference coordination zone is a designation for specific inference coordination restrictions, which limit end nodes assigned to the zone when transmitting to satisfy a network wide interference coordination threshold. For example, end nodes may be assigned to interference coordination zones to provide a high confidence (e.g., 90% or higher) that transmitted packets will be successfully received by a base station on the first try (i.e., limiting packet retries to less than 10 percent). As described herein, each base station is assigned a pool of frequency time resource/PFR zone tuples, which may be dynamically assigned to end nodes in communication with the base station.

Figure 6:
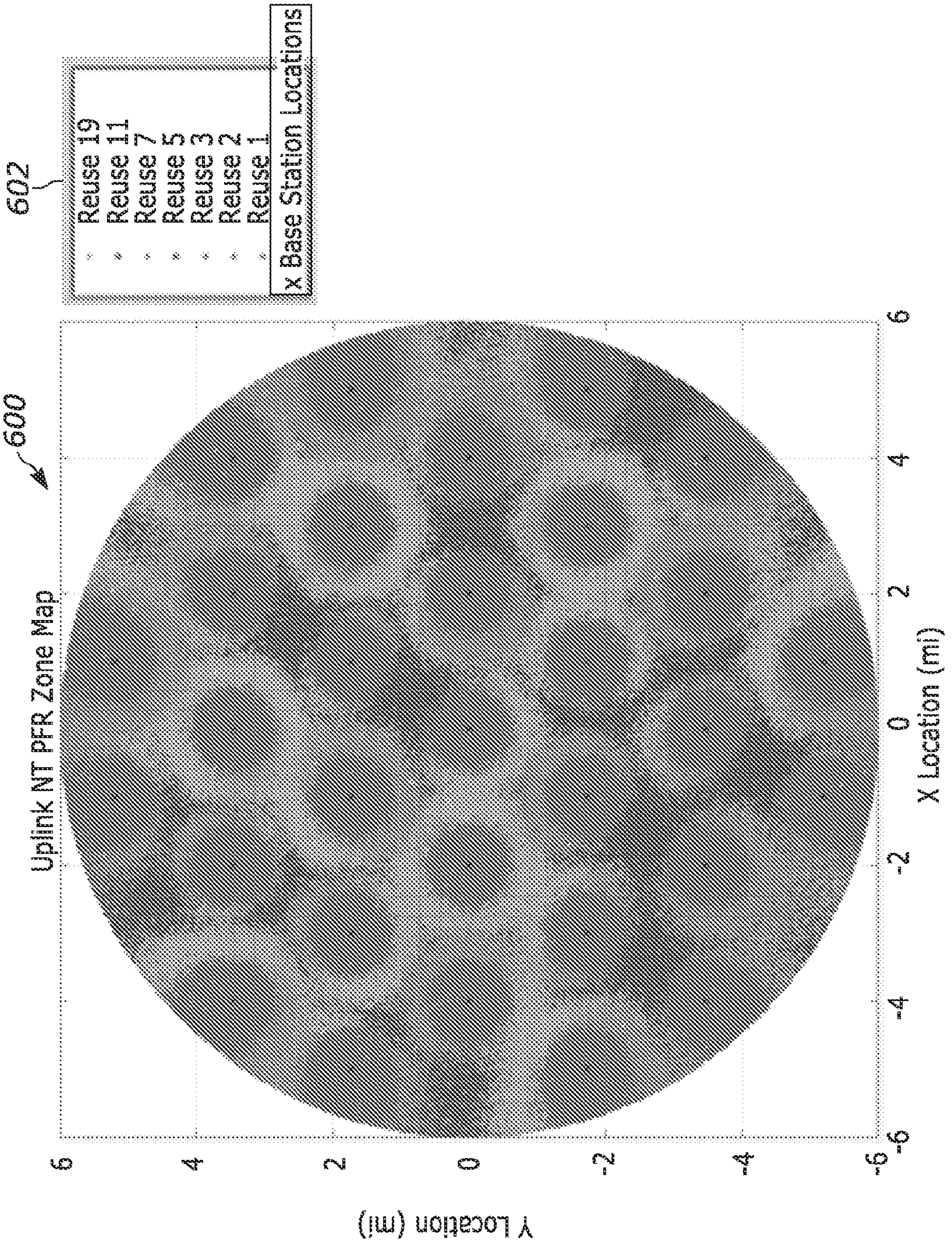
FIG. 6 is a map illustrating an application of the method of FIG. 3 in accordance with some embodiments.

FIG. 6 illustrates a map 600, which represents interference coordination zones (PFR zones) for a simulated field area network with base stations (represented by x's) arranged in a hexagonal pattern with end nodes uniformly distributed across the map. Each small colored dot represents and end node, with the color of the dot representing the PFR zone to which the end node has been assigned (see key 602). As an example, an RF signal to Interference Ratio (SIR) of 17 dB was used for zone determination.

Each PFR zone is noted on the key indicating the spatial reuse factor for the zone. For example, some end nodes are in a PFR zone with a spatial reuse factor of 1. With a reuse factor of 1, one end node for each base station can transmit simultaneously without causing harmful interference to the other end node transmissions. For example, in a field area network with 19 base stations, 19 end nodes could transmit simultaneously on the same channel without causing interference. As the reuse factors increase, each zone is capable of having fewer simultaneous transmissions. With a spatial reuse factor of 2, one end node in that zone can transmit simultaneously for every other base station. With a spatial reuse factor of 3, one end node in that zone can transmit simultaneously for every third base station, and so on until the spatial reuse factor of 19, which indicates only one end node in that zone of the network can transmit at a time.

Figure 11:
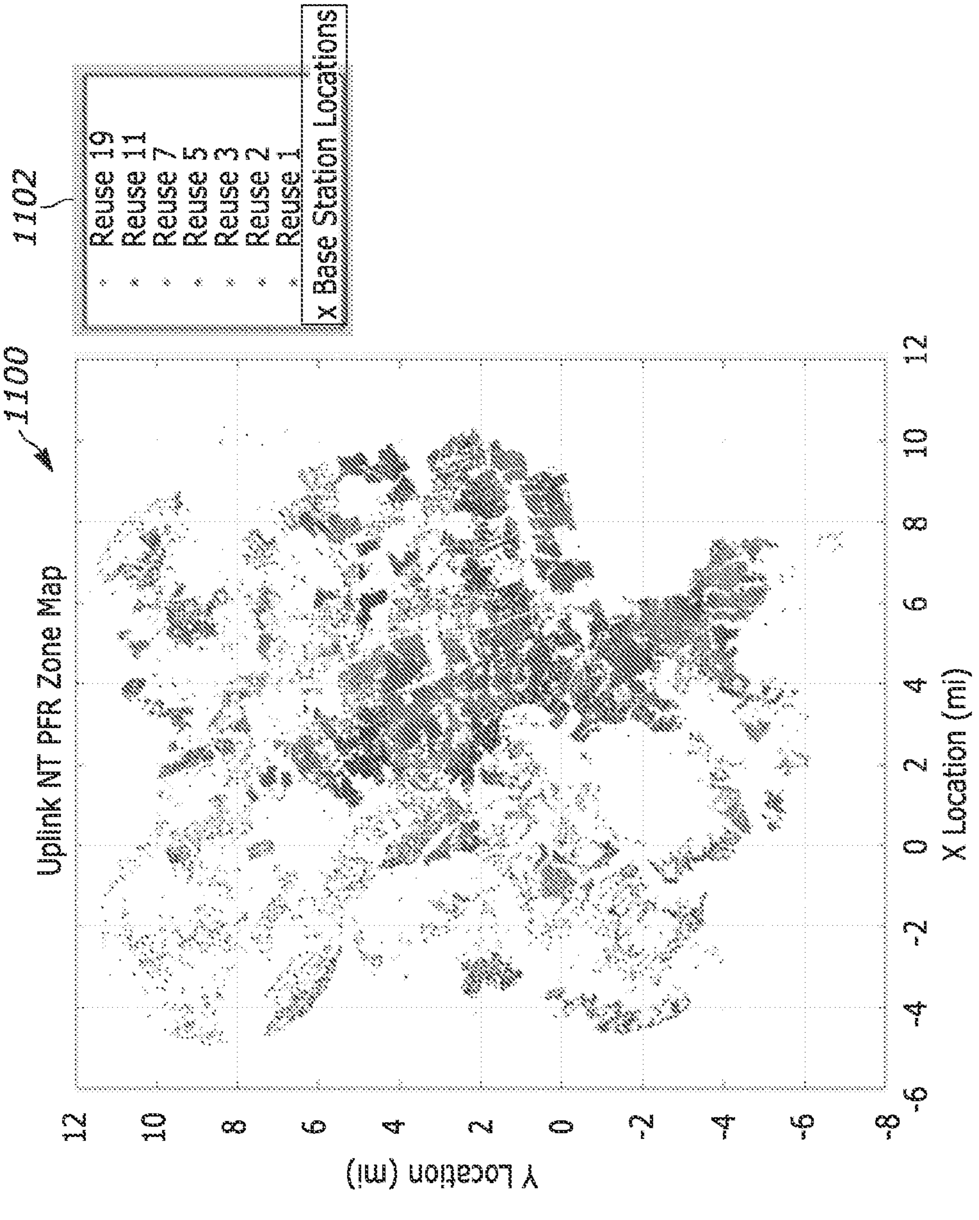
FIG. 11 is a map illustrating an application of the method of FIG. 3 in accordance with some embodiments.

As can be seen from the map, an end node's location is one factor determining the end node's zone, in that the closer a radio transmitter is to its desired receiver, the stronger the radio signal and the less likely it is to be blocked by geography or clutter. However, it should be understood that real world PFR zone distribution may vary considerable from the theoretical example in FIG. 6, such that location alone is not optimal for determining the interference coordination zone for an end node. For example, FIG. 11 illustrates a map 1100 (and key 1102), which represents interference coordination zones (PFR zones) for a deployed field area network with base stations (represented by x's) and end nodes (represented by colored dots) deployed non-uniformly. As such, returning to FIG. 3, the electronic processor 205 selects an interference coordination zone for the end node based on the radiofrequency characteristic for the end node.

In one example, the base station has received downlink pathloss values from the end node as illustrated in FIG. 4. The use of pathloss values in this example should not be considered limiting. In other aspects, other RF distance metrics may be used, as described herein. As would be understood by one skilled in the art, downlink path losses can be used to closely approximate uplink path losses when operating in close spectrally proximity (DL to UL channel spacing). In this example, interference coordination zone (PFR zone) determination is based on signal to interference ratio (SIR) between base stations, and the targeted SIR is 20 dB. As illustrated in FIG. 4, column 408 indicates in binary fashion whether the end node interferes with transmissions. In this example, the end node should be served by base station ID 1 (because it has the lowest path loss), and base stations 2 and 3 would be within the interference coordination restriction (under 20 dB). As noted herein, base stations may receive a matrix of PFR zones and associated FTRs, for example, as illustrated in the table 700 of FIG. 7. Using that matrix as an example, the highest channel capacity would be achieved by having base station ID 1 schedule this end node in PFR zone 3. As shown in column 702 of the table 700, an end node in PFR zone 3 is assigned to transmit while end nodes communicating with base stations 2 and 3 are not permitted to transmit. At the same time, end nodes (in that PFR zone 3) communicating with base stations 4, 7, 10, 13, 16, and 19 are permitted to concurrently transmit and would not harmfully interfere with reception of the end node's transmissions to base station 1 (see table 400). However, if none of those FTRs (designated for PFR zone 3) were available, PFR zone 5, 7, or 19 FTRs could be utilized for the end node, but at the expense of lower spectrum efficiency.

In another example, the base station has received downlink pathloss values from the end node as illustrated in FIG. 5. Here, the end node should be served by base station ID 1 (because it has the lowest path loss), and no base stations would be within the interference coordination restriction, so this end node would optimally use PFR zone 1 FTRs. Looking again to the example matrix table 700, the highest channel capacity would be achieved by having base station ID 1 schedule this end node in PFR zone 1, where an end node determined to be operating in PFR Zone 1 for each base station is allowed to transmit simultaneously without causing interference (see col. 704). Again, if none of those FTRs were available, PFR zone 3, 5, 7, or 19 FTRs could be utilized, but at the expense of lower spectrum efficiency.

In some alternative embodiments, end nodes are configured to select interference coordination zones for themselves using, for example, the method described above for base stations.

Returning to FIG. 3, regardless of how the interference coordination zone is selected, the electronic processor 205, at block 308, selects a frequency time resource for the end node based on the interference coordination zone. In some embodiments, the frequency time resource is an uplink timeslot, which is assigned to the end node to use when transmitting uplink data to the base station. In some embodiments, the frequency time resource is a downlink timeslot, which is assigned to the end node to use when receiving downlink data from the base station. In some embodiments, the frequency time resource is a peer link timeslot, which is assigned to the end node to use when directly with other end nodes within the field area network.

A frequency time resource (FTR) is a logical construct representing a unit of logical radio resource allocated on the field area network. An FTR is defined by, among other things, a frequency, a start time, and a stop time. In simple terms, an FTR is a reservation to transmit (or listen) at a certain frequency during a certain timeframe. As described herein, in some embodiments, an FTR is assigned a permutation identifier, which limits its use to base stations or interference coordination zones operating using the same permutation identifier.

In some embodiments, the FTR is selected using a frequency time resource matrix (FTR Matrix), which includes a plurality of interference coordination zones (PFR zone) associated with a plurality of frequency time resource blocks (FTRBs). In some embodiments, FTR matrices are received by the base station from the core network gateway 118 or the core network 104. In some embodiments, a base station may only be sent a portion or portions of a frequency time resource matrix (for example, depending on network load or other factors).

FIG. 7 includes an example FTR matrix 700 for a statically provisioned solution, which has the dimensions of number of base stations by the sum of all PFR zones supported, rounded up to the nearest second. In some embodiments, the matrix 700 may be repetitive.

The FTR matrix 700 is for an example network that has been designed with 19 base stations, PFR zone types [1,2, 3,5,7,19], and 125 ms long FTRs. In this example, the repeating matrix is 5 seconds in duration and each base station gets at least a single FTR in each PFR zone every 5 seconds. The matrix is provisioned with extra allocations for PFR zone 1 and 2 since they have the highest capacity. Each column (e.g., columns 702, 204) in the table 700 represents a group of FTRs known as an FTR block.

FIG. 8 includes an example FTR matrix 800 that is dynamically created by individually allocating FTR blocks to all base stations operating on the same RF channel/cluster/PFR zone. In this example, the base stations request FTR blocks individually from the core network gateway 118, as FTR blocks are required. The matrix is therefore dynamically built as the network operates.

The FTR matrix 800 is for an example network that has been designed with 19 base stations, PFR zone types [1,2, 3,5,7,19], and 125 ms long FTRs. In this example, the non-repeating matrix is 5 seconds in duration and each base station gets FTRs in PFR zones it specifically requested, along with FTRs that it was dynamically allocated through other base station FTR block requests. More specifically in this example, base station ID 1 first must service an end node in PFR zone 19, so it requests a single FTR block from the core network gateway 118. Next, base station ID 1 must service an end node in PFR zone 2, so it requests a single FTR block from the core network gateway 118. In this example, not only does it get an FTR in PFR zone 2, but every odd number base station ID gets a surplus PFR zone 2 FTR to use in the future.

Because radiofrequency conditions and base station deployments are variable and both the PFR zone distribution and traffic per base station distribution are not uniform, in some embodiments, a hybrid approach between static and dynamic allocations is used. For example, a portion of the available FTR blocks may be statically allocated upon network startup, while the remaining FTR blocks may be allocated dynamically based on network operation needs. For example, FIG. 9 illustrates a FTR matrix 900, with PFR zones [1, 2, 3, 5, 7] and 50 ms FTR intervals. Some FTR blocks are statically allocated as shown, with FTR blocks denoted with an “R” are reserved for dynamic allocation. FIG. 10 illustrates a FTR matrix 1000, which represents an update of the FTR matrix 900, where some reserved FTR blocks have been allocated.

In some embodiments, the electronic processor 205 generates a merged frequency time resource from at least two adjacent frequency time resources of the plurality of frequency time resources based on a radio bearer service type for the end node. For example, where an end node may require the transmission of larger data chunks, the base station may combine two adjacent FTRs and assign one larger merged FTR to the end node to enable transmission of larger data packets. Similarly, in some embodiments, the electronic processor may generate frequency time sub-resources by splitting an FTR based on a radio bearer service type for the end node. For example, two end nodes may each require half the amount of transmitting time that is in an available FTR. In this example, the FTR may be split into two sub-resources, which are assigned to the two end nodes.

As illustrated in FIGS. 7-10, in some embodiments FTR blocks are assigned a permutation identifier, which indicates which FTRs are permitted for use. In such embodiments, each base station has a base station also has a permutation identifier, which indicates to which PFR interference coordination group the base station belongs. This along with the FTR block permutation is used to determine which FTRs the base station can use for communications. A base station has a unique PFR zone permutation for each PFR zone type. This value is determined by the network specific deployment design and considers the specific base station placements and RF environments in which the network will operate.

In some embodiments, other factors may be used to select the FTRs for the end node. For example, the electronic processor 205 may factor in one or more of a radio bearer service type, a quality of service type, a current network load, a current channel load, a victim receiver characteristic, an ack quantity, a retry quantity, a channel busy quantity, a spectrum usage policy, and a user preemption policy.

At block 310, the electronic processor 205 transmits (e.g., via the transceiver 225) a third network message to the end node, the third network message including the frequency time resource. In some embodiments, the network message may be a control protocol message, communicated using a control layer of the protocol stack utilized by the field area network.

As illustrated in FIG. 3, the electronic processor 205 may perform the method 300 repeatedly for multiple end nodes. In addition, because the radio environment is dynamic, the base station may periodically reassign end nodes to different interference coordination zones and timeslots based on changing radiofrequency conditions. In some embodiments, FTRs are assigned by base stations to end nodes with expiring leases, which must be actively renewed by end nodes. FTR's assigned to unrenewed leases are placed back in the pool of available FTR's for reassignment according to the method 300. In some embodiments, an end node will release an FTR (for example, by sending a reservation termination network message to the base station), causing the released FTR to be reallocated to another end node according to the method 300. In some embodiments, FTRs are assigned by the core network gateway to base stations using expiring leases, creating a chain of leases and sub-leases.

Figure 12:
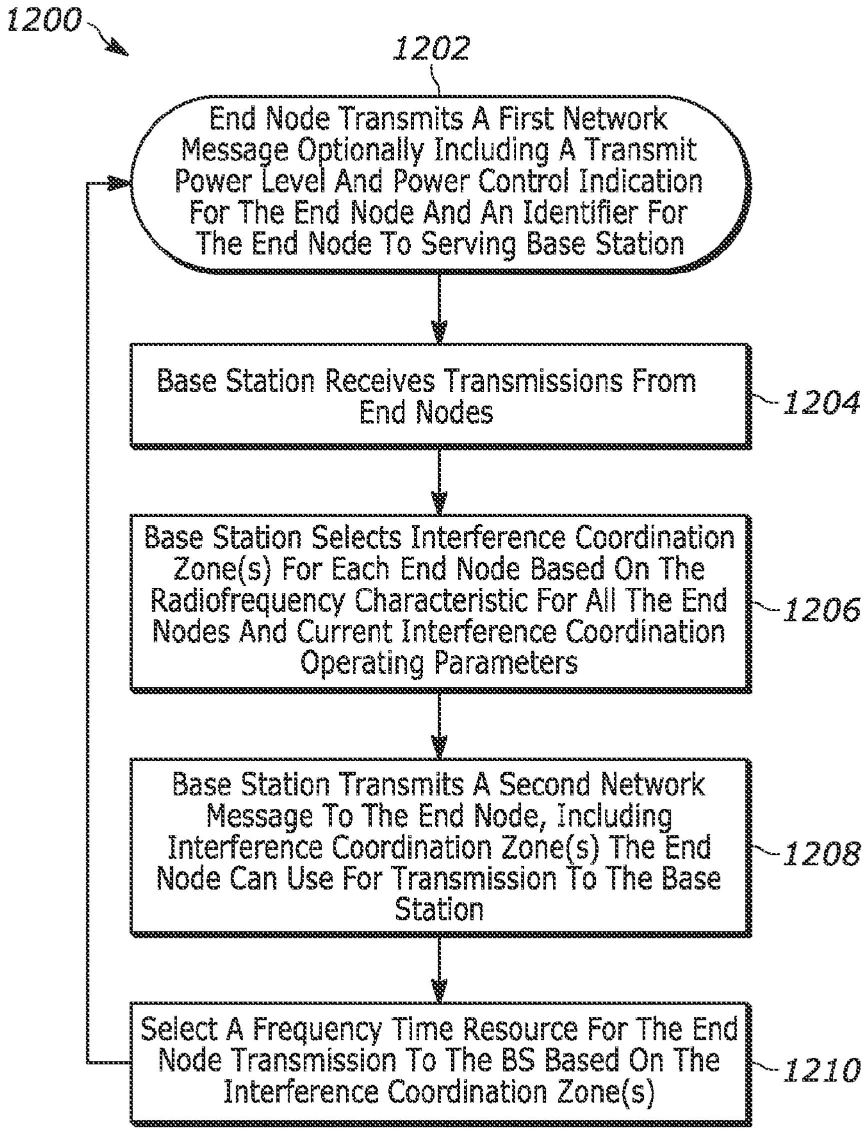
FIG. 12 is a flowchart illustrating a method for partial frequency time resource reuse coordination for interference mitigation in accordance with some embodiments.

FIG. 12 illustrates an example method 1200 for coordinating the partial reuse of frequency time resources (FTRs) to mitigate interference. Although the method 1200 is described in conjunction with the system 100 as described herein, the method 1200 may be used with other systems and devices. In addition, the method 1200 may be modified or performed differently than the specific example provided.

By way of example, the method 1200 is described as being performed by components of the field area network 102, which are described herein. Although described in terms of a single base station communicating with a single end node, embodiments of the method 1200 are applicable to one or more base stations communicating with one or more end nodes.

The method 1200 begins, at block 1202, with an end node transmitting a first network message, which may include one or more of a transmit power level for the end node, a power control indication (e.g., indicating whether the end node is implementing dynamic power control), and an identifier for the end node.

At block 1204, a base station receives the network message sent at block 1202.

At block 1206, the base station selects an interference coordination zone for the end node based on a radiofrequency distance for the end node and current interface coordination operating parameters. Current interference operating coordination parameters include one or more active FTR matrices and may also include one or more of a zone determination RF distance threshold, a radio bearer service type, a quality of service type, a current network load, a current channel load, a victim receiver characteristic, an ack quantity, a retry quantity, a channel busy quantity, a spectrum usage policy, and a user preemption policy.

At block 1208, the base station transmits a second network message to the end node. The second network message includes the interference coordination zone selected for the end node at block 1206.

At block 1210, the end node selects from the interference coordination zone a frequency time resource that it will use when transmitting to the base station.

Figure 13:
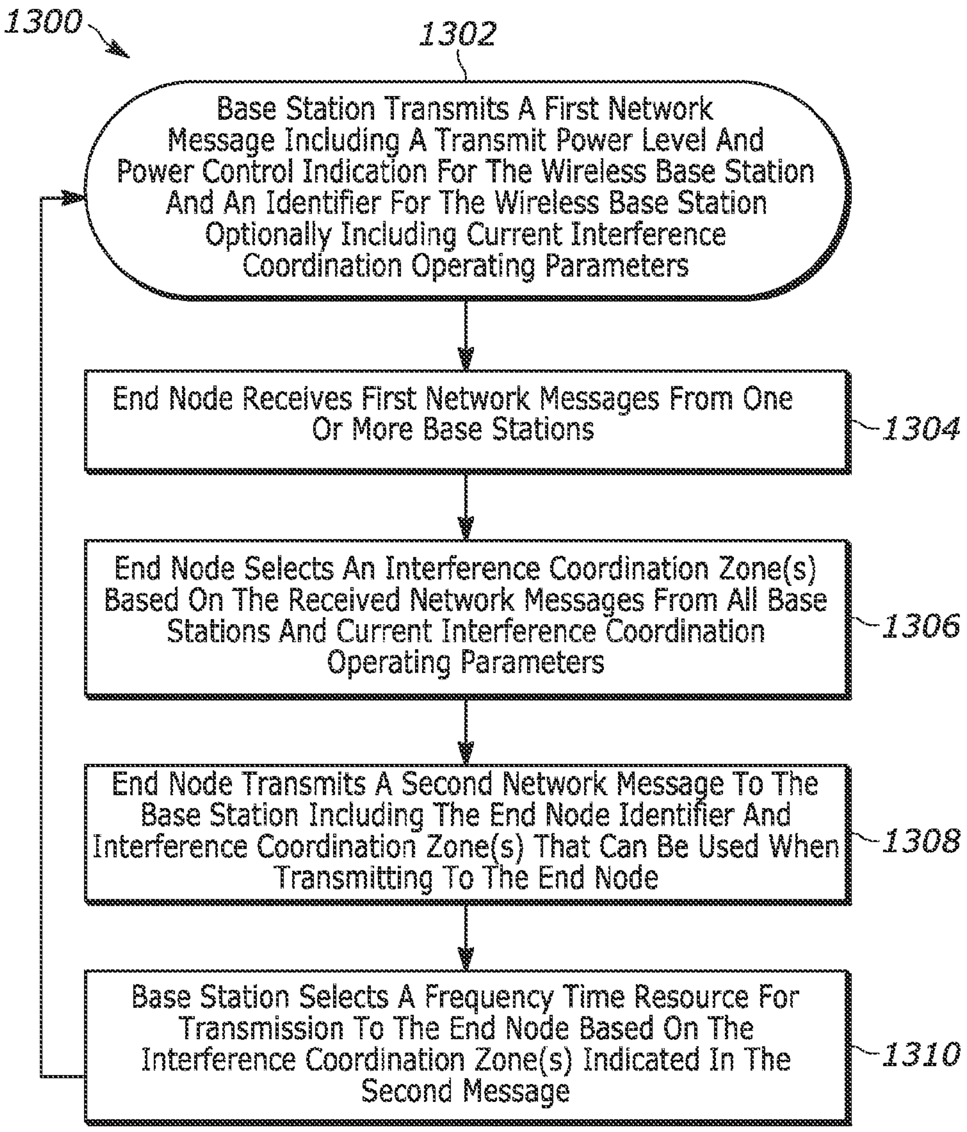
FIG. 13 is a flowchart illustrating a method for partial frequency time resource reuse coordination for interference mitigation in accordance with some embodiments.

FIG. 13 illustrates an example method 1300 for coordinating the partial reuse of frequency time resources (FTRs) to mitigate interference. Although the method 1300 is described in conjunction with the system 100 as described herein, the method 1300 may be used with other systems and devices. In addition, the method 1300 may be modified or performed differently than the specific example provided.

By way of example, the method 1300 is described as being performed by components of the field area network 102, which are described herein. Although described in terms of a single base station communicating with a single end node, embodiments of the method 1300 are applicable to one or more base stations communicating with one or more end nodes.

The method 1300 begins, at block 1302, with a base station transmitting a first network message, which may include one or more of a transmit power level for the base station, a power control indication (e.g., indicating whether the base station is implementing dynamic power control), and an identifier for the base station. In some embodiments, the first network message also includes current interference coordination operating parameters, as described above with respect to FIG. 12.

At block 1304, an end node receives the network message sent at block 1302.

At block 1306, the end node selects an interference coordination zone based on a radiofrequency distance for the base station and the current interface coordination operating parameters received from the base station. In some embodiments, some or all of the current interface coordination operating parameters are stored in the end node (e.g., in a firmware or other memory) and are not received from the base station.

At block 1308, the end node transmits a second network message to the base station. The second network message includes the interference coordination zone selected for the end node at block 1306.

At block 1310, the base station selects from the interference coordination zone indicated in the second network message a frequency time resource that it will use when transmitting to the end node.

When an end node first comes up on the network, or after certain reset procedures, it may not have accurate and/or up to date radio channel measurement information metrics. Accordingly, in some embodiments, the electronic processor 205, upon receiving the first network message from an end node, assigns a conservative interference coordination zone for the end node. A conservative interference coordination zone is one that allows for more interference mitigation (for example, the PFR zone 19 of FIG. 6) than may otherwise be necessary given the actual network conditions. Upon receiving subsequent network messages (including updated radiofrequency signal characteristics for the end node), the electronic processor 205 may determine whether sufficient time has passed since the first such message was received by checking against a threshold time period. For example, an end node's determination of its uplink pathloss might only be considered after it has been operating for a number of minutes. If such a threshold time period has expired, the electronic processor 205 will reassign the end node to a PFR zone based on its reported radiofrequency distance, as described herein. In some embodiments, the base station makes the updated zone determination upon receiving updated radiofrequency signal characteristics for the end node, regardless of whether In some alternative embodiments, the base station may select a subset of the available (unassigned to end nodes) frequency time resources and designate those frequency time resources for use as random access frequency time resources. In such embodiments, a network message (for example, a broadcast message) may indicate to end nodes that random access communications can be attempted using those random access frequency time resources. In some embodiments, an entire channel may be allocated for random access use. In some embodiments, when scheduling is not available or not required, a base station may allocate all of its FTRs for random access use by end nodes.

Some embodiments provided herein have been described in terms of base stations scheduling end nodes for transmission using FTRs. However, it should be noted that such embodiments may be used to schedule downlink communications, uplink communications, random access communications, and peer to peer communications within PFR Zones.

In some embodiments, the logic for determining the interference coordination zone (e.g., using aspects of the method 300 described herein) resides on the end nodes of the network, in addition to or in lieu of the base stations. In some embodiments, the end nodes are configured with a default interference coordination zone or receive one from the serving base station upon startup (as described herein) and operate using the default interference coordination zone until they dynamically determine interference coordination zones for themselves using one or more radiofrequency distance metrics.

In some embodiments, base stations are configured to provide to the end nodes the information needed to determine interference coordination zones. For example, the base stations may transmit network control messages that include an indication of the interference coordination method to be used, as well as zone determination parameters including, for example, interference coordination zones, frequency time resource matrices, RF distance types (e.g., RSSI, SINR, etc.), RF distance thresholds applicable to the RF distance types, and the like. In some embodiments, base stations may be pre-loaded with default information to be used when the end node first joins the network or after subsequent re-starts.

Regardless of where the zone determination logic resides, the determination is made using source information from the perspective of the victim receiver. In some aspects, the victim receiver determines an interference coordination zone for itself using data it collects. In some aspects, another network node determines an interference coordination zone for the victim receiver using information supplied by the victim receiver. Accordingly, in some embodiments, the end nodes determine their own interference coordination zones and transmit the zone information to their respective serving base stations.

In some embodiments, a single end node may be assigned one interference coordination zone for uplink and another interference coordination zone for downlink. The interference coordination zones may be determined by the end node, for the end node (e.g., by its serving base station, or by using a combination of techniques.

In some embodiments, end nodes are configured to automatically (e.g., upon bootup) make a determination regarding a particular interference coordination zone without transmitting messages to a base station or receiving FTR matrices or other interface coordination operating parameters from a base station. For example, as illustrated in FIG. 7, an end node determined to be operating in PFR Zone 1 is able to transmit using any frequency time resource block without causing interference. Because it is possible to determine inclusion in PFR Zone 1 based solely on an SINR ratio measurement, end nodes are able to determine for themselves whether they are in PFR Zone 1. For example, in some embodiments, end nodes are configured to determine whether they are present in PFR Zone 1 and, if such a determination is made, inform their serving base station of the determination. In some embodiments, end nodes making this determination are also configured to periodically check to see if they are still able to operate in PFR Zone 1. In some embodiments, the end nodes may be assigned to another interference coordination zone by their serving base stations as network conditions warrant.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a." "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately." "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

In the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make any one or more than one of the multiple determinations.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The following paragraphs provide various examples of the embodiments disclosed herein.

Example 1 is a wireless base station. The wireless base station comprises an electronic processor and a transceiver coupled to the electronic processor. The electronic processor is configured to transmit, via the transceiver, a first network message including a transmit power level for the wireless base station and an identifier for the wireless base station. The electronic processor is configured to receive, via the transceiver, a second network message from an end node, the second network message including the identifier and a radiofrequency signal characteristic for the end node. The electronic processor is configured to select an interference coordination zone for the end node based on the radiofrequency characteristic for the end node. The electronic processor is configured to select a frequency time resource for the end node based on the interference coordination zone. The electronic processor is configured to transmit, via the transceiver, a third network message to the end node, the third network message including the frequency time resource.

Example 2 may include the subject matter of Example 1 and may further specify that the frequency time resource is defined by a start time, a stop time, and a radiofrequency and that the frequency time resource is one of an uplink timeslot, a downlink timeslot, and a peer link timeslot.

Example 3 may include the subject matter of any of Examples 1 and 2 and may further specify that the electronic processor is configured to receive, via the transceiver, a fourth network message from the end node, the fourth network message including the identifier and an updated radiofrequency signal characteristic for the end node. The electronic processor is configured to select an updated interference coordination zone for the end node based on the updated radiofrequency characteristic for the end node. The electronic processor is configured to select an updated frequency time resource for the end node based on the updated interference coordination zone. The electronic processor is configured to transmit, via the transceiver, a fifth network message to the end node, the fifth network message including the updated frequency time resource.

Example 4 may include the subject matter of any of Examples 1 and 2 and may further specify that the electronic processor is configured to determine the interference coordination zone for the end node by selecting a conservative interference coordination zone for the end node. The electronic processor is configured to receive, via the transceiver, a fourth network message from the end node, the fourth network message including the identifier and an updated radiofrequency signal characteristic for the end node. The electronic processor is configured to, responsive to receiving the fourth network message, determine whether a threshold time period has expired since receiving the second network message. The electronic processor is configured to, responsive to determining that the threshold period of time has expired, select an updated interference coordination zone for the end node based on the updated radiofrequency characteristic for the end node. The electronic processor is configured to select an updated frequency time resource for the end node based on the updated interference coordination zone. The electronic processor is configured to transmit, via the transceiver, a fifth network message to the end node, the fifth network message including the updated frequency time resource.

Example 5 may include the subject matter of any of Examples 1~4 and may further specify that the electronic processor is configured to receive a plurality of interference coordination zones associated with a plurality of frequency time resource blocks. The electronic processor is configured to select the interference coordination zone for the end node from the plurality of interference coordination zones. The electronic processor is configured to select the frequency time resource for the end node from the plurality of frequency time resource blocks.

Example 6 may include the subject matter of Example 5 and may further specify that the electronic processor is configured to generate a merged frequency time resource from at least two adjacent frequency time resources of the plurality of frequency time resource blocks based on a radio bearer service type for the end node. Example 6 may also further specify that selecting the frequency time resource for the end node includes selecting the merged frequency time resource.

Example 7 may include the subject matter of any of Examples 5 and 6 and may further specify that the electronic processor is configured to generate a frequency time sub-resource based on a radio bearer service type for the end node by splitting one the plurality of frequency time resource blocks. Example 7 may also further specify that selecting the frequency time resource for the end node includes selecting the frequency time sub-resource.

Example 8 may include the subject matter of any of Examples 5-7 and may further specify that the electronic processor is configured to receive a plurality of zone permutation identifiers associated with the plurality of interference coordination zones. The electronic processor is configured to select the frequency time resource for the end node based further on the zone permutation identifier associated with the interference coordination zone associated with the frequency time resource.

Example 9 may include the subject matter of any of Examples 5-8 and may further specify that the electronic processor is configured to designate, from among the plurality of frequency time resource blocks, one or more random access frequency time resources. The electronic processor is configured to transmit, via the transceiver, a fourth network message identifying the one or more random access frequency time resources.

Example 10 may include the subject matter of any of Examples 1-9, and may further specify that the electronic processor is configured to select the frequency time resource for the end node based further on at least one selected from the group consisting of a radio bearer service type, a quality of service type, a current network load, a current channel load, a victim receiver characteristic, an ack quantity, a retry quantity, a channel busy quantity, a spectrum usage policy, and a user preemption policy.

Example 11 may include the subject matter of any of Examples 1-10 and may further specify that the electronic processor is configured to receive, from the end node, a reservation termination message. The electronic processor is configured to, responsive to receiving the reservation termination message, reallocate the frequency time resource to a second end node.

Example 12 may include the subject matter of any of Examples 1-11 and may further specify that the electronic processor is configured to transmit, via the transceiver, a periodic timing beacon.

Example 13 may include the subject matter of any of Examples 1-12 and may further specify that the first network message includes an indication of whether or not the base station is using dynamic power control.

Example 14 is a method for operating a wireless base station. The method includes transmitting, via a transceiver, a first network message including a transmit power level for the wireless base station and an identifier for the wireless base station. The method includes receiving, via the transceiver, a second network message from an end node, the second network message including the identifier and a radiofrequency signal characteristic for the end node. The method includes selecting, with an electronic processor, an interference coordination zone for the end node based on the radiofrequency characteristic for the end node. The method includes selecting, with the electronic processor, a frequency time resource for the end node based on the interference coordination zone. The method includes transmitting, via the transceiver, a third network message to the end node, the third network message including the frequency time resource.

Example 15 may include the subject matter of Example 14 and may further specify that the frequency time resource is defined by a start time, a stop time, and a radiofrequency and that selecting the frequency time resource includes selecting one of an uplink timeslot, a downlink timeslot, and a peer link timeslot.

Example 16 may include the subject matter of any of Examples 14 and 15 and may further include receiving a fourth network message from the end node, the fourth network message including the identifier and an updated radiofrequency signal characteristic for the end node. Example 16 may further include selecting an updated interference coordination zone for the end node based on the updated radiofrequency characteristic for the end node. Example 16 may further include selecting an updated frequency time resource for the end node based on the updated interference coordination zone. Example 16 may further include transmitting a fifth network message to the end node, the fifth network message including the updated frequency time resource.

Example 17 may include the subject matter of any of Examples 14 and 15 and may further include determining the interference coordination zone for the end node by selecting a conservative interference coordination zone for the end node. Example 17 may further include receiving a fourth network message from the end node, the fourth network message including the identifier and an updated radiofrequency signal characteristic for the end node. Example 17 may further include, responsive to receiving the fourth network message, determining whether a threshold time period has expired since receiving the second network message. Example 17 may further include, responsive to determining that the threshold period of time has expired, selecting an updated interference coordination zone for the end node based on the updated radiofrequency characteristic for the end node. Example 17 may further include selecting an updated frequency time resource for the end node based on the updated interference coordination zone. Example 17 may further include transmitting a fifth network message to the end node, the fifth network message including the updated frequency time resource.

Example 18 may include the subject matter of any of Examples 14-17 and may further include receiving a plurality of interference coordination zones associated with a plurality of frequency time resource blocks. Example 18 may further include selecting the interference coordination zone for the end node from the plurality of interference coordination zones. Example 18 may further include selecting the frequency time resource for the end node from the plurality of frequency time resource blocks.

Example 19 may include the subject matter of Example 18 and may further include generating a merged frequency time resource from at least two adjacent frequency time resource of the plurality of frequency time resource blocks based on a radio bearer service type for the end node. Example 19 may further specify that selecting the frequency time resource for the end node includes selecting the merged frequency time resource.

Example 20 may include the subject matter of any of Examples 18 and 19 and may further include generating a frequency time sub-resource based on a radio bearer service type for the end node by splitting one the plurality of frequency time resource blocks. Example 20 may further specify that selecting the frequency time resource for the end node includes selecting the frequency time sub-resource.

Example 21 may include the subject matter of any of Examples 18-20 and may further include receiving a plurality of zone permutation identifiers associated with the plurality of interference coordination zones. Example 21 may further include selecting the frequency time resource for the end node based further on a zone permutation identifier associated with the interference coordination zone associated with the frequency time resource.

Example 22 may include the subject matter of any of Examples 18-21, and may further include designating, from the plurality of frequency time resource blocks, one or more random access frequency time resources. Example 22 may further include transmitting a fourth network message identifying the one or more random access frequency time resources.

Example 23 may include the subject matter of any of Examples 14-22, and may further include selecting the frequency time resource based further on at least one selected from the group consisting of a radio bearer service type, a quality of service type, a current network load, a current channel load, a victim receiver characteristic, an ack quantity, a retry quantity, a channel busy quantity, a spectrum usage policy, and a user preemption policy.

Example 24 may include the subject matter of any of Examples 14-23, and may further include receiving, from the end node, a reservation termination message. Example 24 may further include, responsive to receiving the reservation termination message, reallocating the frequency time resource to a second end node.

Example 25 may include the subject matter of any of Examples 14-24 and may further include transmitting a periodic timing beacon.

Example 26 may include the subject matter of any of Examples 14-25 and may further specify that the first network message includes an indication of whether or not the base station is using dynamic power control.

Example 27 may include one or more non-transitory computer readable media having instructions thereon that, when executed by one or more electronic processors, cause the one or more electronic processors to perform the subject matter of any one or more of Examples 14-26 and 38.

Example 28 is a method for operating a wireless network end node. The method includes receiving, via a transceiver, a first network message including a transmit power level for a wireless base station and an identifier for the wireless base station. The method includes determining, for the base station, a radiofrequency distance. The method includes selecting, with an electronic processor, an interference coordination zone for the end node based on the radiofrequency distance. The method includes selecting, with the electronic processor, a frequency time resource based on the interference coordination zone. The method includes transmitting, via the transceiver, a second network message to the base station, the second network message including the frequency time resource.

Example 29 may include the subject matter of Example 28 and may further specify that the first network message includes at least one zone determination parameter. Example 29 may further include selecting the interference coordination zone for the end node based on the at least one zone determination parameter.

Example 30 may include the subject matter of either of Examples 28 and 29 and may further specify that the first network message includes a default interference coordination zone for an end node. Example 30 may further include operating the end node according to the default interference coordination zone until the interference coordination zone is selected.

Example 31 may include the subject matter of any of Examples 28-30 and may further specify that the frequency time resource is defined by a start time, a stop time, and a radiofrequency and that selecting the frequency time resource includes selecting one of an uplink timeslot, a downlink timeslot, and a peer link timeslot.

Example 32 may include the subject matter of any of Examples 28-31 and may further include receiving a plurality of interference coordination zones associated with a plurality of frequency time resource blocks. Example 32 may further include selecting the interference coordination zone for the end node from the plurality of interference coordination zones. Example 18 may further include selecting the frequency time resource for the end node from the plurality of frequency time resource blocks.

Example 33 may include the subject matter of any of Examples 28-32 and may further include receiving a plurality of zone permutation identifiers associated with the plurality of interference coordination zones. Example 33 may further include selecting the frequency time resource for the end node based further on a zone permutation identifier associated with the interference coordination zone associated with the frequency time resource.

Example 34 may include the subject matter of any of Examples 28-33, and may further include selecting the frequency time resource based further on at least one selected from the group consisting of a radio bearer service type, a quality of service type, a current network load, a current channel load, a victim receiver characteristic, an ack quantity, a retry quantity, a channel busy quantity, a spectrum usage policy, and a user preemption policy.

Example 35 may include one or more non-transitory computer readable media having instructions thereon that, when executed by one or more electronic processors, cause the one or more electronic processors to perform the subject matter of any one or more of Examples 28-34.

Example 36 is a wireless end node including an electronic processor configured to operate according to anyone of examples 28-34.

Example 37 may include the subject matter of any of Examples 1-12 and may further specify that the electronic processor is configured to determine a default interference coordination zone for end node uplink transmissions. Example 37 may further specify that the first network message includes the default interference coordination zone.

Example 38 may include the subject matter of any of Examples 14-26 and may further include determining a default interference coordination zone for end node uplink transmissions. Example 38 may further specify that the first network message includes the default interference coordination zone.

Example 39 is a method for operating a wireless base station. The method includes transmitting, via a transceiver, a first network message including a transmit power level for the wireless base station and an identifier for the wireless base station. The method includes receiving, via the transceiver, a second network message from an end node, the second network message including the identifier and a radiofrequency signal characteristic for the end node. The method includes selecting, with an electronic processor, an interference coordination zone for the end node based on the radiofrequency characteristic for the end node. The method includes transmitting, via the transceiver, a third network message to the end node, the third network message including the interference coordination zone.

Example 40 may include the subject matter of Example 39, and may further include designating, from a plurality of frequency time resource blocks associated with the interference coordination zone, one or more random access frequency time resources for use by the end node for uplink transmissions. Example 40 may further include transmitting a fourth network message identifying the one or more random access frequency time resources.

Example 41 may include the subject matter of Example 40 and may further specify that each of the frequency time resource blocks is defined by a start time, a stop time.

Example 42 may include the subject matter of any of Examples 39-41 and may further include receiving a fifth network message from the end node, the fifth network message including the identifier and an updated radiofrequency signal characteristic for the end node. Example 42 may further include selecting an updated interference coordination zone for the end node based on the updated radiofrequency characteristic for the end node. Example 42 may further include transmitting a sixth network message to the end node, the sixth network message including the updated interference coordination zone.

Example 43 may include the subject matter of any of Examples 39-42 and may further include determining the interference coordination zone for the end node by selecting a conservative interference coordination zone for the end node. Example 43 may further include receiving a network message from the end node including the identifier and an updated radiofrequency signal characteristic for the end node. Example 43 may further include, responsive to receiving the network message, selecting an updated interference coordination zone for the end node based on the updated radiofrequency characteristic for the end node. Example 43 may further include transmitting a network message including the updated interference coordination zone to the end node.

Example 44 may include the subject matter of any of Examples 39-43 and may further include selecting the frequency time resource for the end node based further on a zone permutation identifier associated with the interference coordination zone associated with the frequency time resource.

Example 45 may include the subject matter of any of Examples 39-44, and may further include selecting the frequency time resource based further on at least one selected from the group consisting of a radio bearer service type, a quality of service type, a current network load, a current channel load, a victim receiver characteristic, an ack quantity, a retry quantity, a channel busy quantity, a spectrum usage policy, and a user preemption policy.

Example 46 may include one or more non-transitory computer readable media having instructions thereon that, when executed by one or more electronic processors, cause the one or more electronic processors to perform the subject matter of any one or more of Examples 39-45.

Example 47 is a wireless base station including an electronic processor configured to operate according to anyone of examples 39-45.

I claim:

1. A wireless base station comprising:

an electronic processor; and a transceiver coupled to the electronic processor;

wherein the electronic processor is configured to:

determine a default logical interference coordination zone for end node uplink transmissions;

transmit, via the transceiver, a first network message including a transmit power level for the wireless base station, an identifier for the wireless base station, and the default logical interference coordination zone;

receive, via the transceiver, a second network message from an end node, the second network message including the identifier and a radiofrequency signal characteristic for the end node;

select a logical interference coordination zone for the end node based on the radiofrequency characteristic for the end node;

select a frequency time resource for the end node based on the logical interference coordination zone; and transmit, via the transceiver, a third network message to the end node, the third network message including the frequency time resource.

2. The wireless base station of claim 1, wherein the frequency time resource is defined by a start time, a stop time, and a radiofrequency; and wherein the frequency time resource is one of an uplink timeslot, a downlink timeslot, and a peer link timeslot.

3. The wireless base station of claim 1, wherein the electronic processor is further configured to:

receive, via the transceiver, a fourth network message from the end node, the fourth network message including the identifier and an updated radiofrequency signal characteristic for the end node;

select an updated logical interference coordination zone for the end node based on the updated radiofrequency characteristic for the end node;

select an updated frequency time resource for the end node based on the updated logical interference coordination zone; and transmit, via the transceiver, a fifth network message to the end node, the fifth network message including the updated frequency time resource.

4. The wireless base station of claim 1, wherein the electronic processor is further configured to:

determine the logical interference coordination zone for the end node by selecting a conservative logical interference coordination zone for the end node;

receive, via the transceiver, a fourth network message from the end node, the fourth network message including the identifier and an updated radiofrequency signal characteristic for the end node;

responsive to receiving the fourth network message, select an updated logical interference coordination zone for the end node based on the updated radiofrequency characteristic for the end node;

select an updated frequency time resource for the end node based on the updated logical interference coordination zone; and transmit, via the transceiver, a fifth network message to the end node, the fifth network message including the updated frequency time resource.

5. The wireless base station of claim 1, wherein the electronic processor is further configured to:

receive a plurality of logical interference coordination zones associated with a plurality of frequency time resource blocks;

select the logical interference coordination zone for the end node from the plurality of logical interference coordination zones; and select the frequency time resource for the end node from the plurality of frequency time resource blocks.

6. The wireless base station of claim 5, wherein the electronic processor is further configured to:

generate a merged frequency time resource from at least two adjacent frequency time resources of the plurality of frequency time resource blocks based on a radio bearer service type for the end node, and generate a frequency time sub-resource based on the radio bearer service type for the end node by splitting one the plurality of frequency time resource blocks, wherein selecting the frequency time resource for the end node includes selecting one of the frequency time sub-resource or the merged frequency time resource.

7. The wireless base station of claim 5, wherein:

the electronic processor is further configured to receive a plurality of zone permutation identifiers associated with the plurality of logical interference coordination zones; and the electronic processor is further configured to select the frequency time resource for the end node based further on the zone permutation identifier associated with the logical interference coordination zone associated with the frequency time resource.

8. The wireless base station of claim 5, wherein the electronic processor is further configured to:

designate, from among the plurality of frequency time resource blocks, one or more random access frequency time resources; and transmit, via the transceiver, a fourth network message identifying the one or more random access frequency time resources.

9. The wireless base station of claim 1, wherein the electronic processor is further configured to:

select the frequency time resource for the end node based further on at least one selected from the group consisting of a radio bearer service type, a quality of service type, a current network load, a current channel load, a victim receiver characteristic, an ack quantity, a retry quantity, a channel busy quantity, a spectrum usage policy, and a user preemption policy.

10. A method for operating a wireless base station, the method comprising:

determining a default logical interference coordination zone for end node uplink transmissions;

transmitting, via a transceiver, a first network message including a transmit power level for the wireless base station, an identifier for the wireless base station, and the default logical interference coordination zone;

receiving, via the transceiver, a second network message from an end node, the second network message including the identifier and a radiofrequency signal characteristic for the end node;

selecting, with an electronic processor, a logical interference coordination zone for the end node based on the radiofrequency characteristic for the end node;

selecting, with the electronic processor, a frequency time resource for the end node based on the logical interference coordination zone; and transmitting, via the transceiver, a third network message to the end node, the third network message including the frequency time resource.

11. The method of claim 10, wherein the frequency time resource is defined by a start time, a stop time, and a radiofrequency; and wherein selecting the frequency time resource includes selecting one of an uplink timeslot, a downlink timeslot, and a peer link timeslot.

12. The method of claim 10, further comprising:

receiving a fourth network message from the end node, the fourth network message including the identifier and an updated radiofrequency signal characteristic for the end node;

selecting an updated logical interference coordination zone for the end node based on the updated radiofrequency characteristic for the end node;

selecting an updated frequency time resource for the end node based on the updated logical interference coordination zone; and transmitting a fifth network message to the end node, the fifth network message including the updated frequency time resource.

13. The method of claim 10, further comprising:

determining the logical interference coordination zone for the end node by selecting a conservative logical interference coordination zone for the end node;

receiving a fourth network message from the end node, the fourth network message including the identifier and an updated radiofrequency signal characteristic for the end node;

responsive to receiving the fourth network message, selecting an updated logical interference coordination zone for the end node based on the updated radiofrequency characteristic for the end node;

selecting an updated frequency time resource for the end node based on the updated logical interference coordination zone; and transmitting a fifth network message to the end node, the fifth network message including the updated frequency time resource.

14. The method of claim 10, further comprising:

receiving a plurality of interference coordination zones associated with a plurality of frequency time resource blocks;

selecting the logical interference coordination zone for the end node from the plurality of logical interference coordination zones; and selecting the frequency time resource for the end node from the plurality of frequency time resource blocks.

15. The method of claim 14, further comprising:

generating a merged frequency time resource from at least two adjacent frequency time resources of the plurality of frequency time resource blocks based on a radio bearer service type for the end node, and generating a frequency time sub-resource based on the radio bearer service type for the end node by splitting one the plurality of frequency time resource blocks, wherein selecting the frequency time resource for the end node includes selecting one of the frequency time sub-resource or the merged frequency time resource.

16. The method of claim 14, further comprising:

receiving a plurality of zone permutation identifiers associated with the plurality of logical interference coordination zones; and selecting the frequency time resource for the end node based further on a zone permutation identifier associated with the logical interference coordination zone associated with the frequency time resource.

17. The method of claim 14, further comprising:

designating, from the plurality of frequency time resource blocks, one or more random access frequency time resources; and transmitting a fourth network message identifying the one or more random access frequency time resources.

18. The method of claim 10, wherein selecting the frequency time resource for the end node includes selecting the frequency time resource based further on at least one selected from the group consisting of a radio bearer service type, a quality of service type, a current network load, a current channel load, a victim receiver characteristic, an ack quantity, a retry quantity, a channel busy quantity, a spectrum usage policy, and a user preemption policy.

* * * * *